United States Patent [19]
Schindler et al.

[11] Patent Number: 5,900,867
[45] Date of Patent: May 4, 1999

[54] SELF IDENTIFYING REMOTE CONTROL DEVICE HAVING A TELEVISION RECEIVER FOR USE IN A COMPUTER

[75] Inventors: Jeffrey Schindler; Robert Moore, both of Sioux City, Iowa; Sidney D. Autry, Vellingham, Wash.; Rix S. Chan, Dakota Dunes, S. Dak.; Brian A. Bennett, Sioux City, Iowa

[73] Assignee: Gateway 2000, Inc., North Sioux City, S. Dak.

[21] Appl. No.: 08/503,368

[22] Filed: Jul. 17, 1995

[51] Int. Cl.⁶ ....................................... H04N 5/445
[52] U.S. Cl. ........................... 345/327; 345/734; 455/6.3
[58] Field of Search ................. 348/6.7, 10, 12, 348/13, 15, 553, 563, 564, 565, 569, 734; 455/4.1, 4.2, 5.1, 6.1, 6.3, 151.1, 352, 151.2, 186.2, 151.4; 345/156, 157, 158, 160, 161, 168, 169, 170, 172, 173, 327; 341/173, 176, 22, 23; 359/142, 143, 144, 145, 146, 147, 148; 340/407.1, 407.2; 364/188, 189, 234, 234.1, 234.2, 234.3, 234.4, 928, 928.1, 928.2, 928.3, 928.4; 446/143

[56] References Cited

U.S. PATENT DOCUMENTS

| | | | |
|---|---|---|---|
| 4,907,079 | 3/1990 | Turner et al. | 358/84 |
| 5,204,768 | 4/1993 | Tsakiris et al. | 359/148 |
| 5,307,297 | 4/1994 | Iguchi et al. | 364/708.1 |
| 5,331,450 | 7/1994 | Heep et al. | 359/135 |
| 5,339,095 | 8/1994 | Redford | 345/158 |
| 5,500,691 | 3/1996 | Martin et al. | 348/734 |
| 5,515,051 | 5/1996 | Tanaka et al. | 341/174 |
| 5,528,304 | 6/1996 | Cherrick et al. | 348/565 |
| 5,548,304 | 8/1996 | Yoshino et al. | 345/145 |
| 5,561,708 | 10/1996 | Remillard | 348/7 X |

FOREIGN PATENT DOCUMENTS

| | | |
|---|---|---|
| 0 395 097 | 10/1990 | European Pat. Off. |
| 0 617 556 | 9/1994 | European Pat. Off. |
| 90 04 566 | 8/1990 | Germany . |
| 60-206299 | 10/1985 | Japan . |

*Primary Examiner*—Nathan Flynn
*Attorney, Agent, or Firm*—Schwegman, Lundberg, Woessner & Kluth, P.A. and Anthony Claiborne

[57] ABSTRACT

An entertainment system has a personal computer as the heart of the system with a large screen VGA quality monitor as the display of choice. The system has digital satellite broadcast reception, decompression and display capability with multiple radio frequency remote control devices which transmit self identifying signals and have power adjustment capabilities. These capabilities are used to provide context sensitive groups of keys which may be defined to affect only selected applications running in a windowing environment. In addition, the remote control devices combine television and VCR controls with standard personal computer keyboard controls. A keyboard remote also integrates a touchpad which is food contamination resistant and may also be used for user verification. Included in the system is the ability to recognize verbal communications in video signals and maintain a database of such text which is searchable to help identify desired programming in real time.

21 Claims, 20 Drawing Sheets

SELF IDENTIFYING REMOTE CONTROL DEVICE HAVING A TELEVISION RECEIVER FOR USE IN A COMPUTER

RELATED APPLICATIONS

This application is related to:

U.S. patent application Ser. No. 08/502,882, filed Jul. 17, 1995, entitled CONTEXT SENSITIVE REMOTE CONTROL GROUPS, and;

U.S. patent application Ser. No. 08/503,119, filed Jul. 17, 1995, entitled GRAPHICAL USER INTERFACE FOR CONTROL OF A HOME ENTERTAINMENT SYSTEM, and;

U.S. patent application Ser. No. 08/503,120, filed Jul. 17, 1995, entitled HOME ENTERTAINMENT SYSTEM COMBINING COMPLEX PROCESSOR CAPABILITY WITH A HIGH QUALITY DISPLAY, and;

U.S. patent application Ser. No. 08/503,143, filed Jul. 17, 1995, entitled ADJUSTABLE POWER REMOTE CONTROL DEVICE, and;

U.S. patent application Ser. No. 08/503,625, filed Jul. 17, 1995, entitled DATABASE NAVIGATION SYSTEM FOR A HOME ENTERTAINMENT SYSTEM.

FIELD OF THE INVENTION

The present invention relates to remotely controlling electronic devices, and in particular to remotely controlling a home entertainment system with multiple remote control devices.

BACKGROUND OF THE INVENTION

The consumer electronics industry has created many stand alone products for specific functions, such as television viewing, video recording and playback, broadband video receivers, playing recorded music and broadcast music. Some devices combine functions, such as the combination TV/VCR, and the audio cassette/AM/FM receiver to name a couple. One direction that consumers are moving is toward larger televisions located within a family room or living room with accompanying high quality stereo. Multiple components are required, each providing separate functions. A large screen television based on a 19 inch to 40 inch picture tube, or 46 inch to 60 inch projection system is used and viewed from a distance of two to five meters. The television includes a tuner for receiving and decoding National Television Systems Committee (NTSC) signals, infrared receiver circuitry for a remote control, and in many cases stereo and surround sound integrated into it, making it a very expensive device. Further, the consumer likely has a video recorder/player, and perhaps a cable box/set top box to receive cable or satellite transmission which may also include a video tuner and other electronics to handle modulated, compressed and encrypted video signals. In addition, a consumer is also likely to have a separate stereo system complete with CD player, tuner and other audio attachments, such as speakers. This duplicates much of the functionality of the television system and adds to the cost of a home entertainment center.

Most consumer electronic devices come with remote control devices, which as in the case of the television above, require sensing circuitry to receive and process the signals from the remotes. Such controls are typically based on IR signals which can be interrupted by someone walking in front of it, and are not able to be used in a different room from the receiver. While a few have on-screen programming functions, and there are special remote control devices which can be programmed to control multiple consumer electronic devices found in a home entertainment center, there is little consistency between such controls. In addition, there is no good way to use different remote control units to control different programs generating the information displayed in various windows on the screen. This leads to confusion of the consumer, and the classic case of the blinking "12:00" as consumers become frustrated trying to master all the protocols required to appropriately control their electronic devices. Trying to program a VCR to record a program in the future can also be quite difficult. The expense of the additional circuitry in all the devices to accomplish these functions is borne by the consumer.

Multimedia based personal computers today are configured with CD Rom drives, and speakers as well as graphics drivers for displaying graphics on a monitor attached to the computer. CD Rom drives are capable of both reading data, such as computer programs, and reading audio information such as music which is output from the attached speakers. Multimedia titles for running on a PC usually are distributed on CD Rom, and involve such things as animated encyclopedias and other books, as well as games that may incorporate video clips which can be shown on a PC display. More and more of the video information on such CDs is compressed in accordance with Motion Picture Experts Group (MPEG) standards and requires commercially available software or circuitry to decompress it and process it for display. The display signal is typically of VGA quality. Some add on products for PCs even provide a connection to video feeds from multiple sources for playing in a window on the monitor screen. Typically, the computer has a video graphics adapter (VGA or SVGA) card which processes all the information to be displayed on a monitor and the monitor itself is basically a picture tube that shows only what it is sent with very little processing. However, most PC displays are small, and not suitable for viewing by multiple people at the same time. It often happens that when a family gets a new program such as a game, animated book or educational game, everyone wants to see it being used for the first time, and they huddle around a small display and vie for positions. In addition, there is no good way for multiple users to interact on a single computer. For viewing video feeds from cable or satellite, large screen consumer television sets are most commonly used in the home entertainment center.

As can be seen, there is great duplication of function between the consumer electronics and personal computers, both of which are more and more likely to be found in a family room or great room of a home. This duplication of function leads to much more money being spent to fully outfit the home entertainment center and provide additional functions. When one component fails, since it has duplicate function, it is expensive to replace. One system that tried to solve some of the above problems is shown in U.S. Pat. No. 5,192,999 to Graczyk et al. That system has a television circuit and an audio circuit within a personal computer, both of which are controlled by a remote control device. The television circuit is used to receive common cable or broadcast video signals in NTSC format, which inherently have a lower quality than video signals currently broadcast by digital broadcasting satellite. NTSC format signals are interlaced, which means that every other line is refreshed during each scan of the picture tube. For example, odd lines would be refreshed during a first scan, and even lines during a second scan. Since there are 60 scans per second, odd lines are refreshed 30 times per second, and even lines are refreshed 30 times per second. VGA monitors refresh at least 60 times per second, providing a more coherent spacial and temporal image. The NTSC signal is a lower bandwidth signal than digital MPEG, which has a much higher bandwidth and allows productive use of even higher resolution monitors. While Graczyk et al. does convert the NTSC signals to VGA format for display by a data quality analog monitor, the signal quality is limited because of the lower bandwidth transmission. NTSC signals have a great effect on the type of text that can be displayed. With an interlaced display, the text displayed in normal fonts appears to jump as alternate lines are refreshed. There have been several attempts to design fonts that minimize this jump effect, but none have worked well. A VGA display, refreshing each line with every scan of the tube, does not have this problem, and provides a much sharper and readable image for text.

The monitor described by Graczyk is shown as a standard PC analog VGA monitor, and reference is commonly made to a single user. Such monitors are fairly small, having a maximum viewing area of 17.5 inches (44.5 cm) at the high end of the PC market. They are not nearly suitable for viewing in a home entertainment environment. They are designed for close viewing, having pixels very close together. Current home entertainment systems are much larger and expensive due to all the other circuitry they have as described above.

One satellite broadcast system is that provided by DirecTV, a unit of GM Hughes Electronics. Direct Broadcast Satellites, "DBS" provide more than 150 channels of high-quality MPEG based video, sound and data to 18 inch (45.7 cm) receiving antennas. Rights to make subscriber terminals are licensed by DirectTV, and several other companies contributing technology. News Datacom Corporation provides encryption and security for the DBS system, providing decryption keys, software and an access card for each subscriber terminal. Thomson Consumer Electronics provides consumer subscriber terminals in the form of set top boxes called integrated receiver/decoders "IRDs" which convert the high-quality television signals into NTSC for showing on a standard television. Each IRD demodulates, decodes, decrypts and outputs video and data, which is displayed on a subscriber television. Error correction, decompression and demultiplexing to separate out video data from other data is also provided in the IRD. While S Video output is provided, there is no provision for monitor/VGA quality output capability. Other sources of MPEG based video include optical fiber based cable systems, compact disk, video clips available on the Internet network, both old and proposed HDCD (high-definition compact disk) formats, and other existing and proposed satellite, digital cable, and asynchronous-transfer mode ("ATM")-based systems as well as wireless digital broadcasts.

SUMMARY OF THE INVENTION

A multipurpose computer system is provided with circuitry to control consumer electronics, such as a large monitor or television for group interaction and of text, graphics and video in a home entertainment environment. The circuitry provides audio and video tuning capability for display of received high quality video signals on the monitor without an intermediate conversion to a lower quality NTSC format. The circuitry decodes the received video signals and converts them to VGA format which provides images of higher quality than NTSC. The monitor is capable of directly displaying VGA signals, and is not required to have a television tuner circuit, remote control, or audio circuitry. This significantly reduces the cost of the monitor and improves the quality of display as opposed to typical large screen televisions which contain complex tuning circuitry.

In one embodiment, the high quality video signals are received from satellites broadcasting digital video signals, digital cable signals and other wireless digital broadcasts. One example is direct broadcasting satellite "DBS" signals having a quality of video signal higher than that provided by NTSC broadcasts. The DBS signals are MPEG-compressed video, audio and data. The DBS signals are received by a video receiver circuit board which is compatible with a standard personal computer peripheral component interconnect (PCI) bus and fits within the chassis of a personal computer. The video receiver cards have panel connectors for receiving coax cable from an antenna which directly receives the DBS signals. The card has functional blocks comprising a satellite tuner, digital demodulator, forward error correction, conditional access and decryption/demultiplexing. The demultiplexor provides the capability of receiving data packets which range from information on television programs being broadcast, to computer programs for downloading into computer memory.

The video receiver card outputs digital video, audio and data streams onto the peripheral component interconnect "PCI" bus where it can be accessed by the computer main processor for manipulation and storage. When stored in a personal computer memory, the program information may be organized in a commercially available database format. This permits the use of database functions to be applied to the data. Rather than being stuck viewing the program information as provided by the broadcaster, the data immediately becomes manipulable by database commands, allowing queries of program information. Searches are used to show programs having certain actors or subject matter, and even have programs meeting the query automatically recorded. One use entails a user designating a series to be recorded, and the database keeps track of what has been recorded or already viewed, avoiding duplicate recording, as well as providing easy access to the recorded programs. In general, by capturing data along with video and audio in a form which a personal computer can process, the possibilities for computer applications are endless. Interaction with movies, classrooms, other players of games such as golf and a host of other possibilities becomes clear.

Further embodiments of the system include a settop box version, where all the circuitry is integrated into one or two cards in a box designed to sit on top of a television set having VGA input. In another version, all the circuitry is included inside of the television chassis.

In one embodiment of the invention, closed caption information provided in video signals is captured, and stored in the database for searching. This provides the ability to instantly find current programming discussing events that a user is interested in. In a further embodiment, speech recognition circuitry is used to convert speech to text or commands for similar searching capability. Given current speech recognition capabilities, not all words may be recognized. Only those that are recognized are stored in the database or used as a command. Much of the information so captured is not relevant in a certain amount of time, so a data retention mechanism is used to identify old data and delete it from the database once the database has exceeded its allocated resource level. A standard FIFO algorithm based on the time expired since the programs described have been shown is employed. Further algorithms are user selectable to relevancy rank data in accordance with user preference.

A video graphics adapter (VGA) card also coupled to the PCI bus converts the digital data stream into VGA and video signals for display on the monitor. In addition to being a home entertainment system, a fully functional computer system forms the heart of the entertainment system. Instead of buying all the individual consumer electronics parts, such as a large screen television, settop box for receiving broadband video, audio amplifier/receiver, CD player, universal remote control, video game machine, answering machine and fax, and a personal computer as some consumers do today, they need only buy the home entertainment system of the present invention. The cost is about the same as that for the individual traditional consumer electronics parts, making the personal computer essentially free.

Support for remote control of both the personal computer and the monitor functions is also provided in the personal computer as well as standard PC VGA graphic display functions normally associated with personal computers. Additional functions also become available based on the integration of devices and digitized data, video and audio. In this manner, no audio, remote control or channel tuning electronics is required in the display, which results in a much lower price for a large monitor suitable for home entertainment. Both a handheld remote control having standard television and in one embodiment, video cassette recorder controls, and a full function remote keyboard having similar standard television and video cassette recorder controls are provided. Both transmit key signals identifying the key pressed, as well as a signal identifying the source of the key signal. The key signals are preferably RF signals typically in the megahertz range, but can also be IR or other suitable form of radiation. RF signals have the advantage over infrared "IR" signals in that they are not interrupted by someone walking between the remote and the receiver. Light source interference and jamming of other IR receivers is minimized by using RF signals. It may also be used in a different room from the receiver.

The personal computer contains suitable receiving circuitry, which provides indications of the keys being pressed, with the identity of the remote control device sending the signal. In one embodiment, an industry standard architecture (ISA) board or module is plugged into both the keyboard and mouse ports. Another bus, such as a serial, RS232 or microchannel bus may also be used. The board contains RF receiver circuitry which receives the RF signals, decodes them and routes them to the appropriate port for processing. A receiving module is programmed to distinguish between the sources of the remote control transmitted signals, and directs keystrokes to the keyboard port, and mouse movements to the mouse port. The signals at the two ports then control which program the remote key signals affect. If the handheld remote is activated, the key signals usually would control what channel is being displayed, or cause a recorded program to fast forward, play or reverse. It could however be selected to move to the next image or otherwise control a program designed to display pictures taken on a digital camera. Keyboard keys are more likely to control a computer program application such as a word processor, spread sheet or electronic mail program. In one embodiment, the television like controls are used to override the remote hand held television controls in channel selection. Just as easily, the hand held remote controls paging through electronic mail. Additionally, the hand held remote has a pointing device, such as a trackball, or miniature joystick with normally associated keys for selecting functions identified by the cursor on the display being moved by the pointing device. The keyboard contains an integrated touchpad for performing similar function, and additionally for transmitting signatures, providing the ability to ensure that an authorized user is requesting a transaction. Given the entertainment room environment, a touchpad provides the further benefit of being able to withstand greasy popcorn and chicken fingers which might foul other pointing devices. In a further embodiment, each remote control device has its own unique cursor associated with it. In this manner, it is easier for the user of a particular device to know which program will be affected when the remote is used.

The remote controls are also used to control the data supplied to more than one display. In one embodiment, a display is located in a den, where it is displaying a financial application, such as a checkbook balancing program. The personal computer is set up to drive multiple monitors, and the remote control keyboard is assigned to the monitor in the den to control the running and display of information from the financial application.

The remote control devices are used to control one or more cursors displayed on the monitor as part of a graphical user interface into the home entertainment system. Cells displayed as boxes containing descriptive text are associated with video programs and with video programs and with computer programs, may be selected to view and/or run the programs. Several icons, such as pictures, video clips or list boxes indicating functions, like record are used to provide functions by dragging and dropping cells onto the icons. Other icons include remind, buy, picture in picture and view full screen to name a few. In one embodiment, each remote control controls its own cursor to allow multiple users to control different portions of the system.

In a further preferred embodiment, the remote control devices are equipped with a user mechanism to reduce the power of the transmitted radio frequency signals depending on their distance from the computer. Circuitry is provided to detect the power level of the signal received and provide an indication on the computer screen, or transmit power level signals back to the remote control device indicative of the power level of the signal received. The remote control device has means to adjust the power, either by the user varying the resistance of the power amplifier, or by digital adjustment of the power amplifier based on the power level signals transmitted from the computer. The ability to control the power level of the signals helps lengthen the time required between replacing batteries which power the remotes.

In yet a further embodiment, remote earphones are provided. The personal computer has the capability to generate separate sound tracks for each window being displayed on the monitor. It assigns each to one or more sets of earphones and transmits a local FM signal or broadcast IR or RF which is received and played by the earphones set to the right channel. The earphones have tuning circuitry that allows them to be set to a desired channel, or they may be fixed to different frequencies, and software is used to set the frequency or frequencies on which the audio associated with a window is broadcast.

DESCRIPTION OF THE PREFERRED EMBODIMENT

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be present inventions. The following detailed description is, therefore, not to be taken in a limiting sense, and the scope of the present inventions is defined only by the appended claims.

Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1:
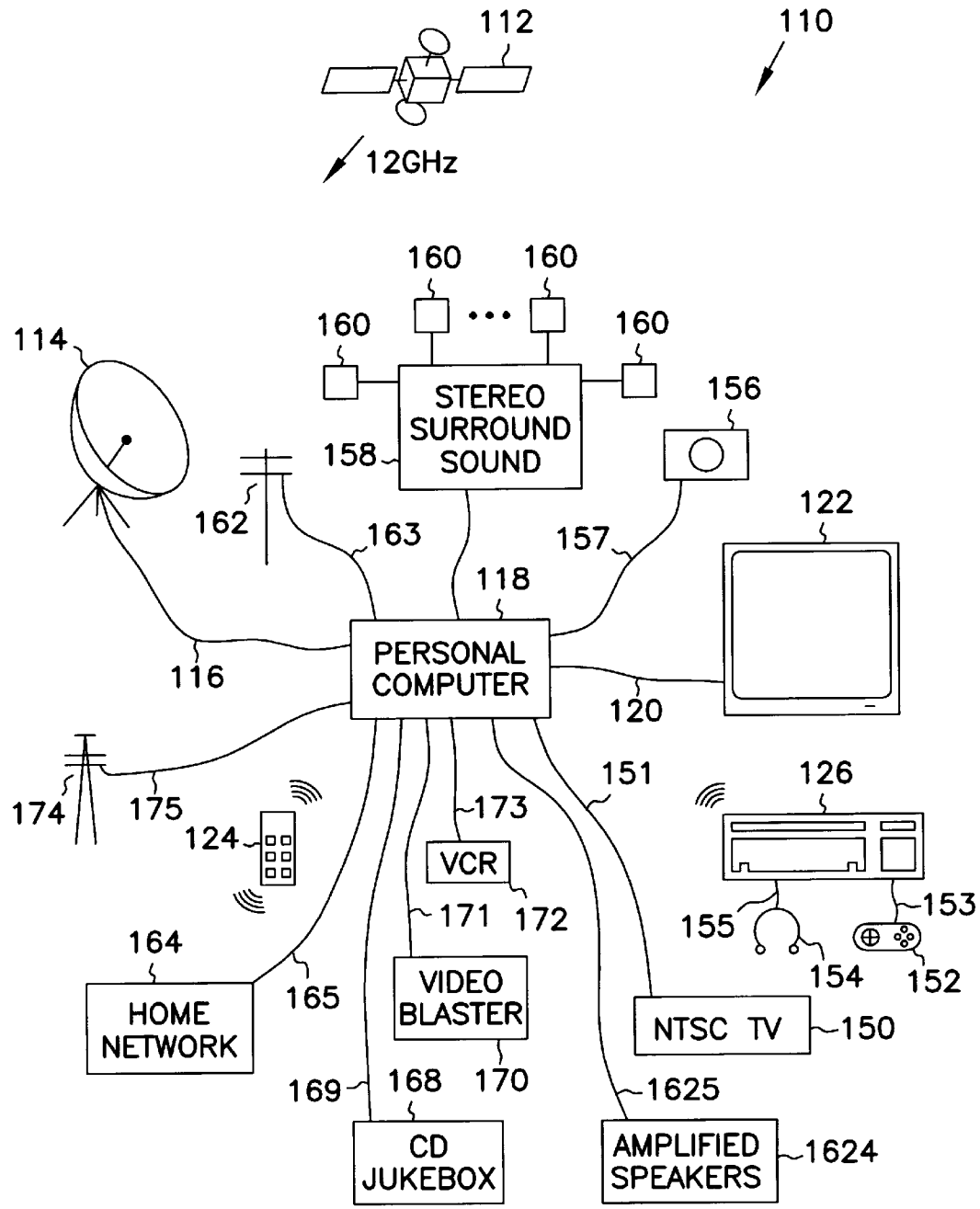
FIG. 1 is a block diagram of a home entertainment system for processing and displaying high quality video in accordance with the present invention.

In FIG. 1, a home entertainment system is shown generally at 110. External to the home entertainment system, a satellite 112, which in one preferred embodiment is a HS601 model, operated by Hughes at a 101 degree west longitude geosynchronous orbital location, transmits signals comprising 150 channels of modulated digital video, audio and data signals at a frequency of about 12 GHz. The satellite signals are received by the home entertainment system 110 by an antenna 114 containing a low noise block converter amplifier. The antenna is preferably about 18 inches in diameter and receives left and right hand circularly polarized signals between 12.2 and 12.7 Ghz. The antenna provides a "downconverted-spectrum" signal between 950 and 1450 MHz via a coaxial cable or other suitable communication medium 116 to a system device 118, such as a personal computer or other system or circuitry capable of processing data. Suitable antennas are already being manufactured and sold by RCA Corporation by direct sales and through numerous major retail chains such as Radio Shack. The system 118 contains circuitry and software to further processes the signals from the antenna, generally demodulating and decoding the signal to produce a VGA signal. The VGA signal is provided via a standard VGA compatible monitor cable 120 to drive a large screen data quality monitor 122 suitable for viewing in a family room or entertainment type room environment. The system 118 provides for user input by means of remote controls 124 and 126. Remote control 124 comprises a handheld size device with standard television controls and numeric keypad, and in one embodiment, VCR controls and a pointing device. It provides RF (radio-frequency) or IR (infrared) control signals received by the system 118. Remote control 126 is a full function personal computer keyboard, with additional standard television and VCR controls, pointing device which is preferably in the form of a touchpad, and it also provides RF control signals to the system 118. RF control signals were selected over IR or hardwired in one embodiment due to the home entertainment environment. It allows the system to be in a different room from the monitor 122, or if in the same room, a clear line of sight is not required. In another embodiment, IR control signals were selected because of the availability of many standard circuitry at low cost. Further detail of the remote control devices is provided below.

Figure 2:
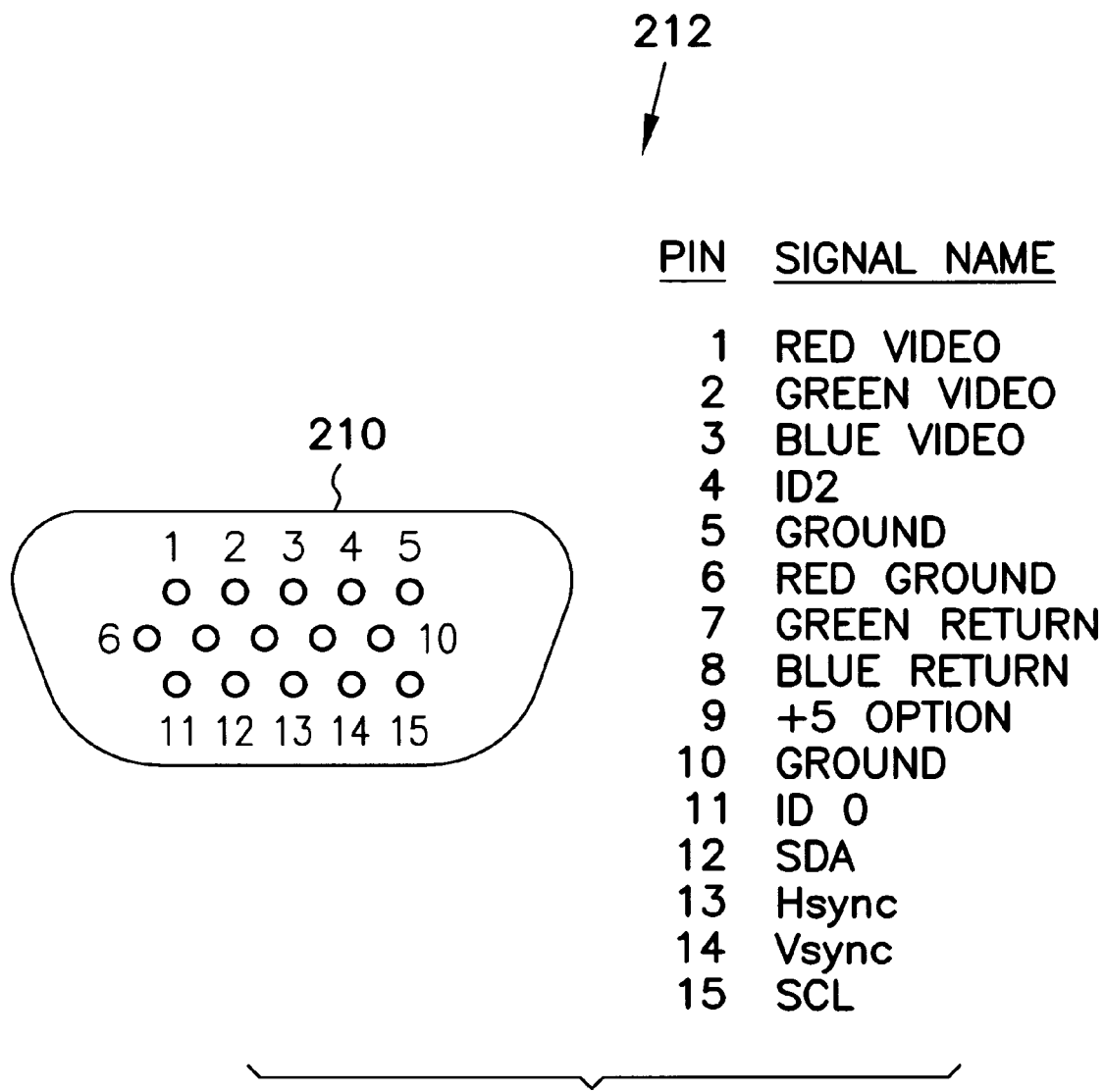
FIG. 2 is a top view representation of the end of a shell connector for coupling to a monitor in accordance with the present invention.

The monitor cable 120 is a standard type cable typically used on VGA display devices, and comprises up to fifteen electrical conductors, interfacing with the monitor 122 in a D series shell connector indicated at 210 in FIG. 2. The fifteen leads, some of which are blank, end in pins in the connector which is a molded over, shielded, triple row, 15 position, subminiature D, straight male plug. The leads are labelled and identified in a table indicated generally at 212 next to the representation of shell connector 210. The monitor contains a suitable female connector for receiving the male shell connector 210.

The monitor 122 in FIG. 1 is preferably capable of displaying at least VGA quality data and video. At least 640 by 480 pixels of resolution are displayable on the monitor. Alternative monitors of higher quality, such as SVGA providing an even greater number of pixels are also used in a further embodiment. Many common graphics cards support multiple such formats, providing great flexibility. The tube size is 33 inches with a diagonal viewing size of 31 inches. An alternative tube size of 29 inches with 27 inch viewing area is lower cost and more suitable for an entry model entertainment system. Monitor 122 preferably contains an analog tube with an aspect ratio of 4 by 3, supports VGA input, has a dot pitch of approximately 0.8 to 0.95 millimeters for the 33 inch tube and 0.65 to 0.8 millimeters for the 29 inch tube with a misconvergence of 1 to 1.5 millimeters, a bandwidth of 15 Mhz, a brightness of about 33 FL. One CRT which may be used is manufactured by Mitsubishi, having a model and type number of M79KKZ111X. The above specifications may easily be modified for larger tube sizes, but are designed to provide optimal viewability from a distance of less than two to about four meters for a combination of data and high quality video. If the viewing distance is desired to be less, the tube size and dot pitch should be decreased. If the tube size is not decreased, more pixels would need to be displayed for adequate viewing of data. SVGA monitors providing more lines would be more appropriate. Standard digital monitor controls to control brightness, contrast, vertical and horizontal sizing and positioning, on/off (rest/resume) are also provided, with both a user accessible manual control panel, and circuitry for receiving control information from personal computer 18 in via monitor cable 120. Further embodiments of monitor 22 include larger displays of 35 and 40 inches viewable and LCD large projection screen type displays. Both aspect ratios of 4:3 and 16:9, commonly referred to as wide screen are supported.

Figure 3:
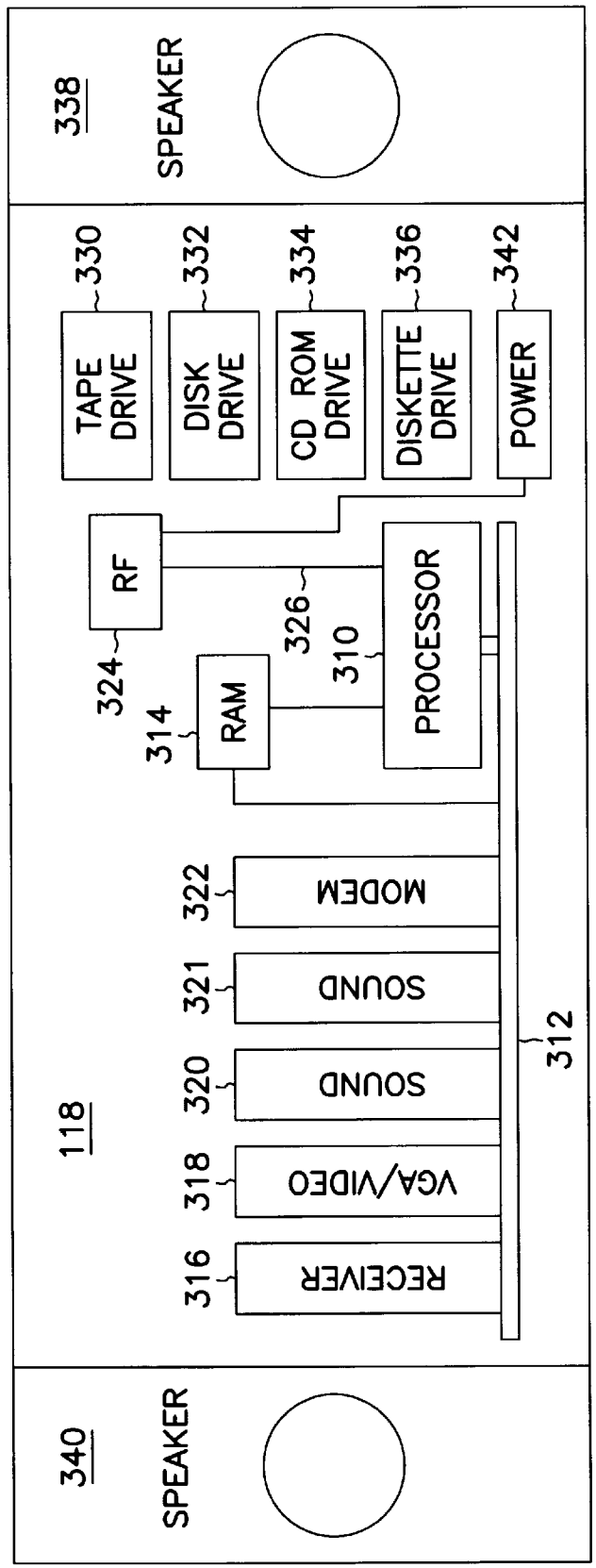
FIG. 3 is a block diagram showing major components of a personal computer in the home entertainment system of FIG. 1.

Further detail of the functional blocks of system 118 are shown in FIG. 3. A processor 310 resides on a system board containing an industry standard PCI bus 312. A random access memory 314 is coupled to both the processor 310 for direct access, and to the PCI bus 312 for direct access by other components also coupled to the PCI bus 312.

The other components comprise a receiver 316, video graphics adapter, VGA converter card 318, sound card 320 and modem 322. An RF receiver 324 is coupled to standard keyboard and mouse ports, which in turn are coupled through a standard keyboard/mouse adapter to an ISA bus 326 to processor 310. Both keyboard 126 and handheld remote 124 transmit RF signals identifying the key pressed, as well as a signal identifying the source of the key signal. The RF signals are typically in the megahertz range, but can also be IR or other suitable form of radiation. RF signals have the advantage over infrared "IR" signals in that they are not interrupted by someone walking between the remote and the receiver. This is especially important during a drag and drop type of activity. If the signal is interrupted for example, a needed document might be dropped on a trash can icon, causing the document to be unintentionally deleted. Light source interference and jamming of other IR receivers is minimized by using RF signals. It may also be used in a different room from the receiver.

RF receiver 324 receives the RF signals, which provide indications of the keys being pressed along with the identity of the remote control device sending the signal. RF receiver 324 comprises an ISA board or module plugged into both standard keyboard and mouse ports. The board contains RF receiver circuitry which receives the RF signals, decodes them and routes them to the appropriate port for processing. A system controller program running on processor 310 supervises software drivers which are programmed to distinguish between the sources, and control which program the remote key signals affect. If the handheld remote is activated, the key signals usually would control what channel is being displayed, or cause a recorded program to fast forward, play or reverse. It could however be selected to move to the next image in a program designed to display pictures taken on a digital camera. Keyboard keys are more likely to control a computer program application such as a word processor, spread sheet or electronic mail program. However, the television like controls might be used to override the remote hand held television controls in channel selection.

Further elements of the preferred embodiment of the present invention include a tape drive 330 for backup of data and storage of video information, such as a movie or other program, a fixed disk drive 332 for storing programs and data, a CD ROM drive 334, and a diskette drive 336, all as commonly known in the personal computer art. A pair of speakers 338 and 340 are also provided. A power supply and associated control circuitry is indicated at 342, and is coupled to the RF receiver 324 to receive signals representative of power on and power off commands from the remote control devices. Power circuitry 342 maintains power to the RF receiver 324 even when the rest of the system is shut down to ensure that the power on signal is received and executed. To avoid accidental powering off of the system, two consecutive power off signals must be received before the system is powered down.

In one preferred embodiment, processor 310 is a 100 mhz Pentium processor, RAM 314 comprises a minimum of 16 megabytes, disk drive 332 is a 1.5 gigabyte IDE hard drive, the CD ROM drive 334 is a quad speed, 3 disc changer, and the fax/modem is a standard 28.8 k bits-per-second (or "KBAUD") modem. It should be noted that components in personal computers are getting faster, smaller and cheaper with higher capacity. It is easily anticipated that larger memories and faster modems and processors will be preferable over the next 20 plus years. In an alternative preferred embodiment, a very high speed processor 310 is used, and receiver 316 simply comprises circuitry to transform received signals into a digital format. The remainder of the functions of the receiver 316 and VGA card 318 are performed by software routines to receive, tune multiple simultaneous channels, decompress, perform error checking and correction and convert the digital signals into digital VGA format. The VGA card 318 in this embodiment simply comprises a digital to analog converter.

Figure 4:
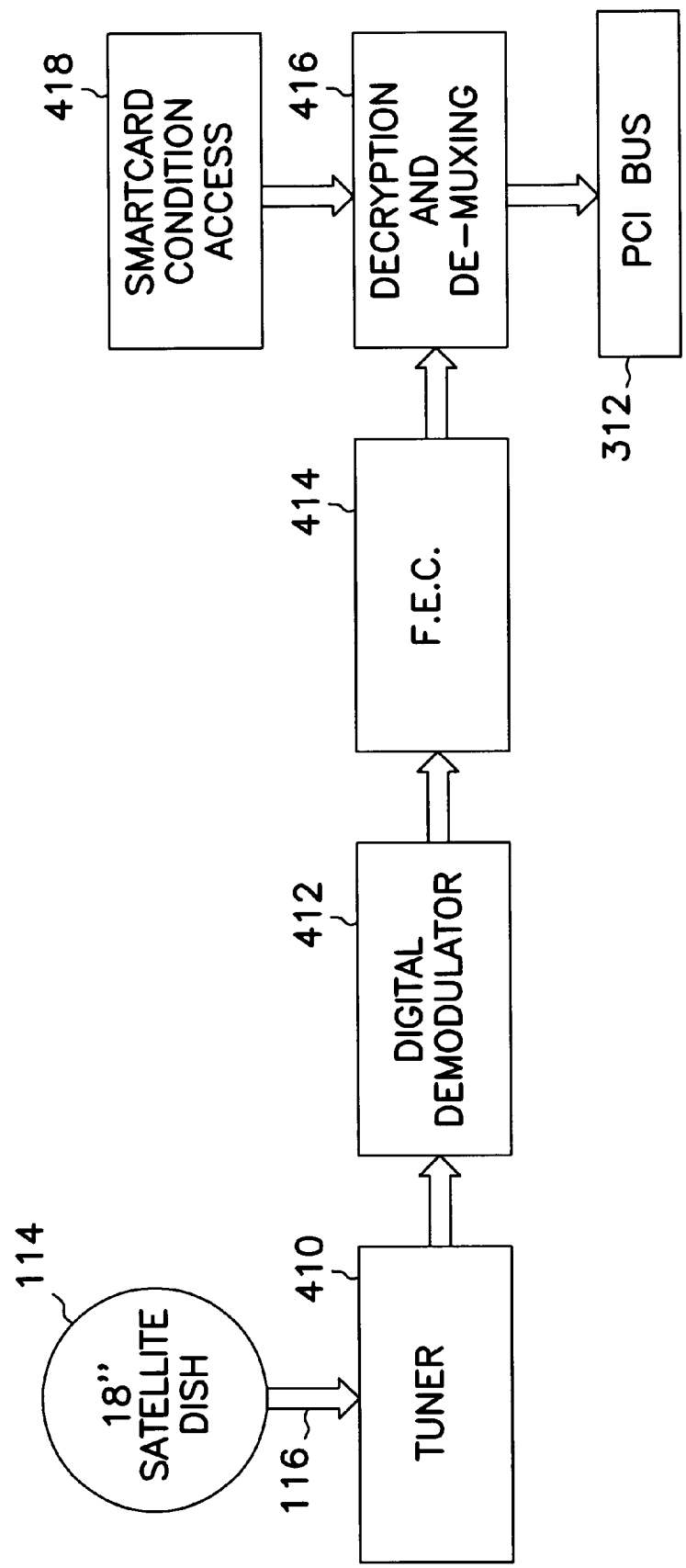
FIG. 4 is a block diagram of a tuning circuit in the personal computer of FIG. 3.

Receiver 316 is shown in further detail in FIG. 4. A tuner 410 receives the direct broadcast signal from antenna 114 via standard coaxial cable 116. The broadcast signal is 150 channels of high-quality television, including data, compressed in accordance with motion picture expert group, MPEG-1 standards with MPEG-2 expected to be available in the near future. The information is carried on an approximately 12 gigahertz carrier, and the receiver 316 selects channels from the carrier and performs analog to digital conversion of the signal. A demodulator 412 is coupled to tuner 410 for demodulation of the digital signals. Forward error correction is provided via standard Viterbi and Reed-Solomon algorithms at block 414. The output of block 414 comprises an encrypted digital signal, in one embodiment encrypted in accordance with data encryption standards "DES." While it is not important to precisely reproduce the video signal, it is much more important to get the data such as computer programs and financial information accurately. The above error correction algorithms are designed to reduce the error rate for data to $10^{-12}$ errors per byte of data. For video and audio, an error rate of $10^{-8}$ is acceptable. The error corrected encrypted digital signal is supplied to a decryption and demultiplexing block 416. Block 416 is coupled to a conditional access card 418 which provides the key for decrypting the digital signal. Upon separating the multiplexed digital decrypted signal, it is provided as digital MPEG conforming signals via a connector 420 to PCI bus 312.

In operation, when processor 310 executes a command, such as changing a channel, it sends the command over the PCI bus 312 to receiver 316, where tuner 410 tunes in a different channel, and the video signals are processed and sent on to VGA card 318 and sound card 320. Once on PCI bus 312, the digital MPEG signal may follow several different courses. In one embodiment, a buffer is allocated from RAM 314 to hold a user selected amount of compressed video data or information comprising computer programs. The same buffer concept may be applied to disk drive 332, which is useful for holding an even larger amount of information. Tape drive 330 is preferably an 8 millimeter tape device, and is useful for storing entire programs of data or MPEG compressed video/audio information. The tradeoffs for each storage device are clear, with the cost of storage per megabyte increasing with the speed with which it may be retrieved. Hence, while RAM provides very fast access, it is a limited resource, and does not make sense to use for much more then a few seconds of video related data. Also, it is a transitory memory in that it does not persist if power is removed. It is most useful for buffering about 10 seconds worth of video information. While it is not possible to predict how long a block of data will play when converting to video, 10 seconds is about 15 megabytes of data. The tape drive 330 is the cheapest form of data storage, but is not randomly accessible. In other words, it can take some time for the tape to move to the right place before desired data can be retrieved for playing. However, it does provide the most cost effective storage for linear playback of movies and television shows. A disk drive 332 is has an average access time of about 10 milliseconds, making it a nice tradeoff between tape and RAM for buffering portions of video information and allowing the user to select and quickly play back desired buffered video. It, like tape is also persistent.

When the MPEG data is buffered, a FIFO type of buffer is used, with new information written over the oldest information when the buffer is full. Through use of the television and VCR remote controls on handheld remote 124 and keyboard 126, VCR-like instant replay functions are provided from the buffered MPEG data. The buffered data is sent back under processor 310 control via the PCI bus 312 to the VGA card 318 for display on monitor 122.

Figure 5:
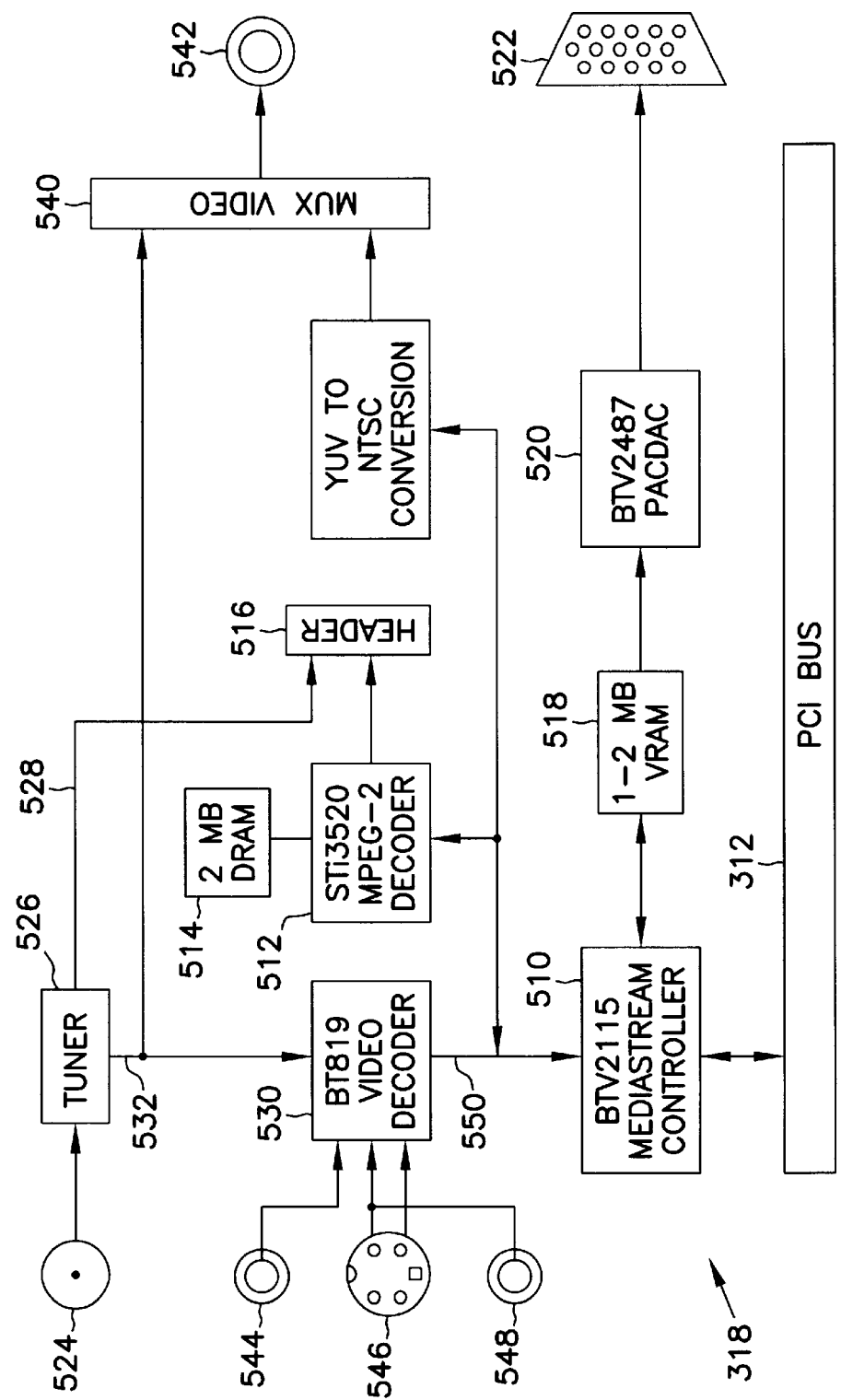
FIG. 5 is a block diagram of a video graphics adapter in the personal computer of FIG. 3.

The VGA card 318 is now described with reference to FIG. 5. In FIG. 5, a controller 510 is coupled to the PCI bus to receive MPEG encoded video, and other normal personal computer display information such as graphics and text. If controller 510 detects MPEG data on PCI bus 312, it routes it to a decoder 512 with associated dynamic random access memory of 2 megabytes, DRAM 514. Decoder 512 decodes the MPEG data in accordance with MPEG standards. A commercially available chip from SGS-Thompson Microelectronics, part number STi3520 is one such decompressor chip which performs the decompression. DRAM 514 is used as a buffer to assist in the decoding, since large amounts of data are required at one time to decode MPEG data. Audio information from the decoded MPEG data is provided to a header 516 for transmission to the sound card 320. The decoded video signal in YUV color encoding is provided back to controller 510 which then places the video information into a dynamic random access memory or video random access memory, VRAM 518. A converter 520 retrieves the information from VRAM 518 and generates standard analog VGA display signals on a cable adapter 522 which mates with shell 210 in FIG. 2 for display.

Other audio video inputs are provided on VGA card 318, including a standard cable connector at 524 coupled to a video tuner circuit 526. Tuner 526 provides both an audio output on line 528 to header 516, and an audio video signal to a video decoder 530 via line 532. Line 532 is also coupled to a video multiplexer 540, which selects one of at least two NTSC compatible audio video signals it receives to an audio video out panel connector 542. Video decoder 530 also receives audio video inputs from further panel connectors, comprising RCA jack 544, S-video pin 546 and a second RCA jack 548. The video signals provided on these lines are decoded by decoder 530 into YUV video output on line 550, which also receives decoded MPEG signals from decoder 512. Both these signals are available for display by VGA display via controller 510 without conversion to NTSC. An alternative is to route the signals on line 550 to a YUV to NTSC converter 552, which feeds video multiplexer 540 for display on a standard television of NTSC signals. However, conversion to NTSC results in an inferior picture being generated from what is received in either S-video or from the antenna 114 as represented by the MPEG signals on PCI bus 312. By not converting to NTSC, the entire transmitted image may be displayed. Prior art NTSC conversion lead to a cropping of the image to ensure that the image presented was not degraded at the edges. The present invention provides the ability to scale for provision of the entire transmitted image without quality loss at the edges, since it provides a digital video signal. No overscan is required as is needed to ensure smooth display borders for NTSC analog transmissions.

Figure 6:
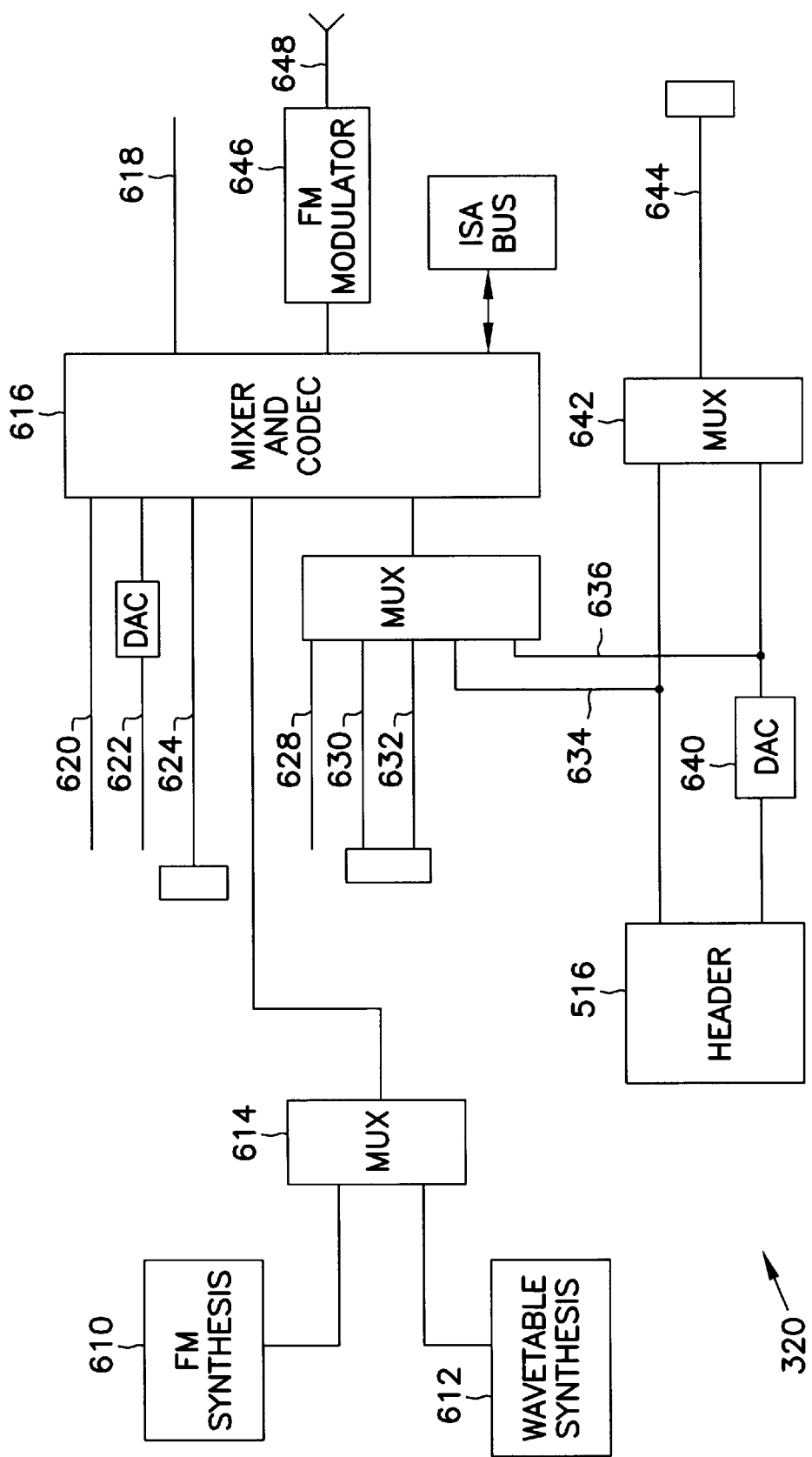
FIG. 6 is a block diagram of an audio card in the personal computer of FIG. 3.

Sound card 320 is shown in further detail in the functional block diagram of FIG. 6. Both FM synthesis and wavetable synthesis are provided at 610 and 612 respectively. Their outputs are mixed or multiplexed at 614 and provided to a mixer and coder/decoder 616 which provides a line out 618 containing SoundBlaster compatible output for connection to standard speakers if desired. In a further embodiment, surround sound compatible output is provided. Mixer 616 also has a microphone input line 620, a CD audio digital line in 622 one embodiment, and a CD audio analog line in 624. A multiplexer 626 also multiplexes multiple input lines into mixer 616. A line in 628 and two audio/video lines 630 and 632 are multiplexed by multiplexer 626, as are signals received from header 516 via lines 634 and 636. Line 634 is coupled through header 516 to tuner 526, providing an audio signal from channels on cable connector 524. Header 516 is also coupled to MPEG decoder 512 to provide MPEG PCM (pulse-code modulation) audio through digital to analog converter 640 to line 636. Lines 636 and 634 are also coupled through a further multiplexer 642 to provide a line out of VCR compatible audio on a line 644.

Figure 7:
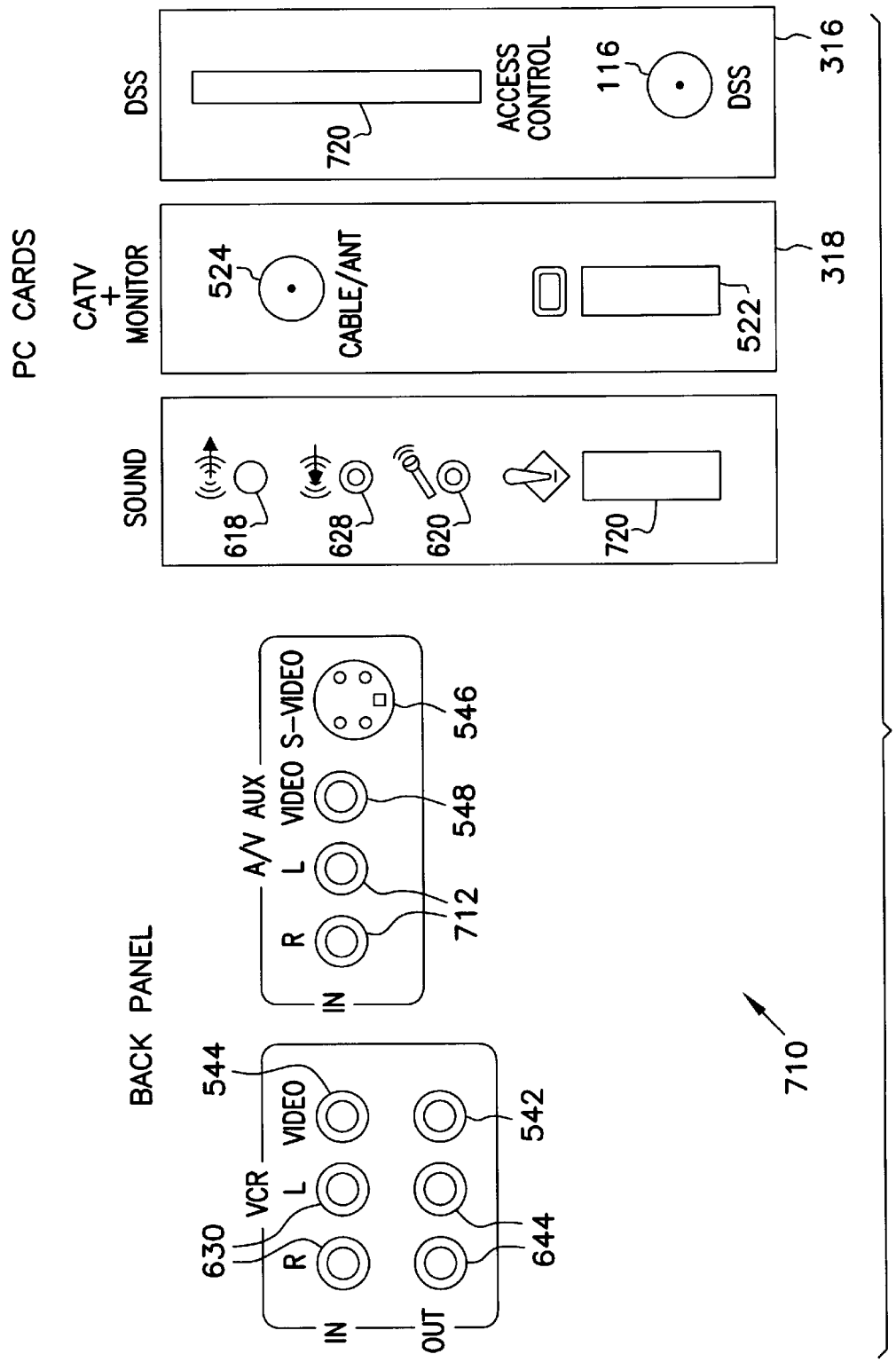
FIG. 7 is a block diagram showing input and output connectors which are provided in the personal computer of FIG. 3.

FIG. 7 shows multiple ports available on the back panel of the personal computer 118, and on the cards shown in FIGS. 4, 5 and 6. The back panel connections are shown generally at 710. The audio video inputs comprise RCA jack 544 and audio left and right speaker connectors 630 for receiving audio video input from a VCR or game machine, S-video pin 546 and auxiliary RCA jack 548 for receiving audio video input from a VCR, camcorder or laserdisc and left and right audio connectors 712. Audio video out connectors 542 and 644 are available on the back panel 710 for coupling to a VCR for recording. Sound card 320 contains connectors 618, 620 and 628 on the mounting bracket, plus a game port 720. VGA card 318 contains the coaxial cable connection 524 and the VGA output port 522. Digital receiver card 316 contains the coaxial cable connector to coaxial cable 116, and a slot for the conditional access card 418 indicated at 720. Slot 720 may be a standard PCM/CIA slot (also referred to as CardBus or PC Card), or any other type of connector desired, such as one specified by News Datacom, who is providing such digital satellite system (DSS) cards for settop boxes. By providing the above connectors and ports on the back side of the personal computer, they are accessible for easy wiring, but also out of view in the home entertainment center.

Figure 8:
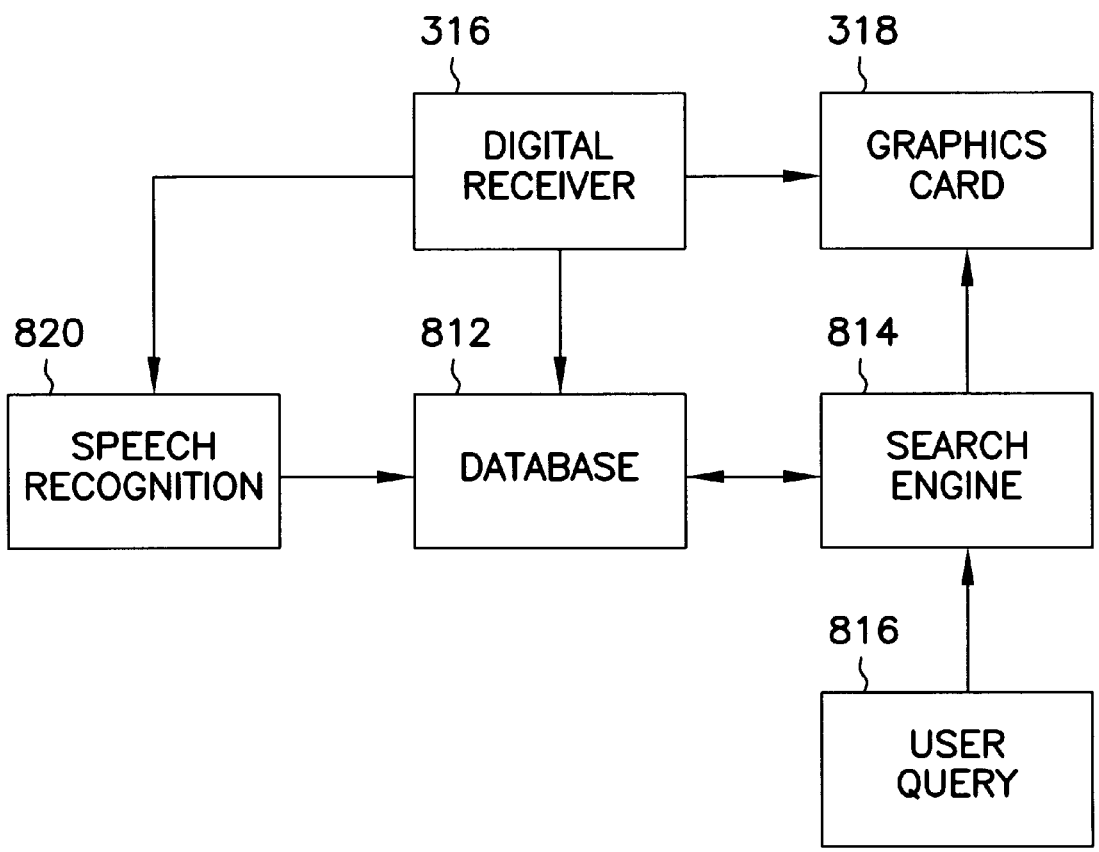
FIG. 8 is a block functional diagram showing the functional elements of a database storing programming information which can be displayed on the system of FIG. 1.

The DSS signal on coax cable 116 also contains data relating to television programming scheduling and closed caption information. In some video broadcast services, the closed caption information is contained in the vertical blanking interval of video signals. This information is captured by the receiver 316 and separated out from the video and audio signals, and provided on the PCI bus to RAM 324 where it is accessible to processor 310. It can also be stored on any other storage device capable of storing text or other digital data. As shown in FIG. 8, the text is stored directly into a database 812 on RAM 324 or disk drive 332. In one preferred embodiment, database 812 comprises flat files of the entire text provided by receiver 316. No organization is applied to it other than sequential as received. A search engine 814 running on processor 310 accepts user queries indicated at 816 in the form of key words. All standard commercial database query functionality, such as proximity searching, query by example, wildcard letters, etc are applicable. Search engine 814 then applies the query to the database 812 and supplies the results back through the VGA card 318 for display. The data is preferably formatted as specified by the user, most likely in terms of the title of the program, the time that it will be on, and the channel that it will be on. Further information, such as descriptions of the program, and at least partial credits including director and actors may also be specified to be provided by the user. Closed caption information is stored separately from the programming information and may be queried separately. Where a separate data channel contains all the closed caption information for the channels containing video information, it is easy to store the closed caption information for all the channels. However, if it is required to decode each video MPEG channel, then only the closed caption information from one channel at a time is stored. An auto surf function cycles through desired channels, picking up portions of closed caption information, which can then also be searched. This is very useful when looking for current event type programming. Perhaps a user is interested in a particular place, or when a particular feature on a desirable topic starts. A query to review all the current and past mentions of the place or feature during live programming can quickly alert the user to broadcasts satisfying the query. Where closed caption is not supported, the sound track from video is fed into a speech recognition program 820 running on processor 310 which recognizes at least a few words from current television programming, and will improve with time and advancement in linguistic parsing. For now, only the words that are recognized are fed into yet another partition of the database which can be independently searched.

Figure 9A:
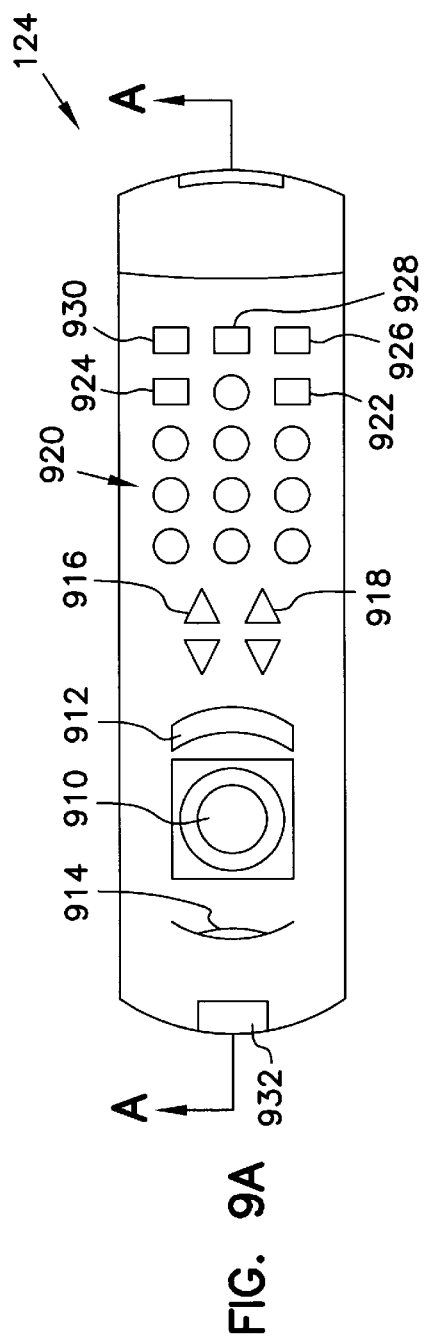
FIG. 9a is a top view of a hand held remote control device in one embodiment of the present invention.
Figure 9B:
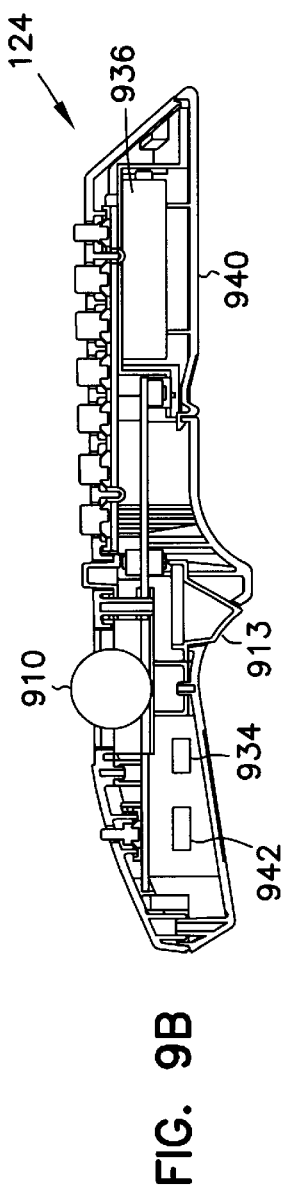
FIG. 9b is a cut away side view of a hand held remote control device in one embodiment of the present invention.
Figure 9C:
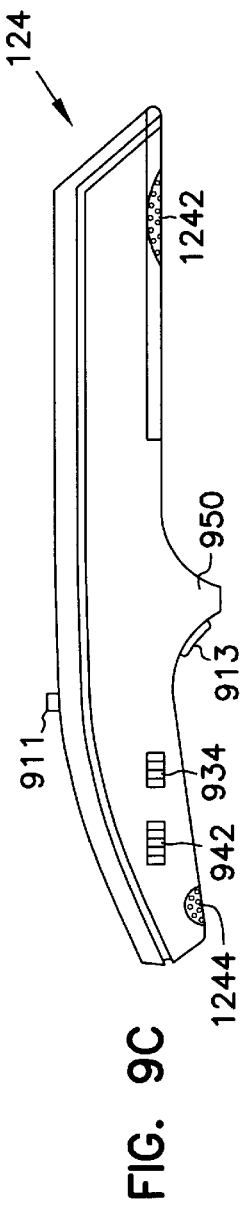
FIG. 9c is a cut away side view of an alternative hand held remote control device in one embodiment of the present invention.

Various views of the hand held remote control 124 are shown in FIGS. 9a, 9b, and 9c. A 19 millimeter optical trackball 910 is integrated into the remote, and functions just as any other pointing device for personal computers, generating cursor control signals that are transmitted to the personal computer 118. In a further preferred embodiment, the cursor control device is a miniature joystick shown at 911 in FIG. 9C, that is operated by a finger being placed on top of the stick and pushing in the direction of desired cursor movement. Selection buttons, or mouse clickers are provided at 912 for the user to press to select functions on the personal computer that the cursor is touching. An additional trigger like selection button is provided at 913, which is convenient for use by an index finger if holding and pointing the remote in a natural position. It is also useful as a pseudo trigger for many games, and for one handed dragging and dropping of icons.

Figure 10:
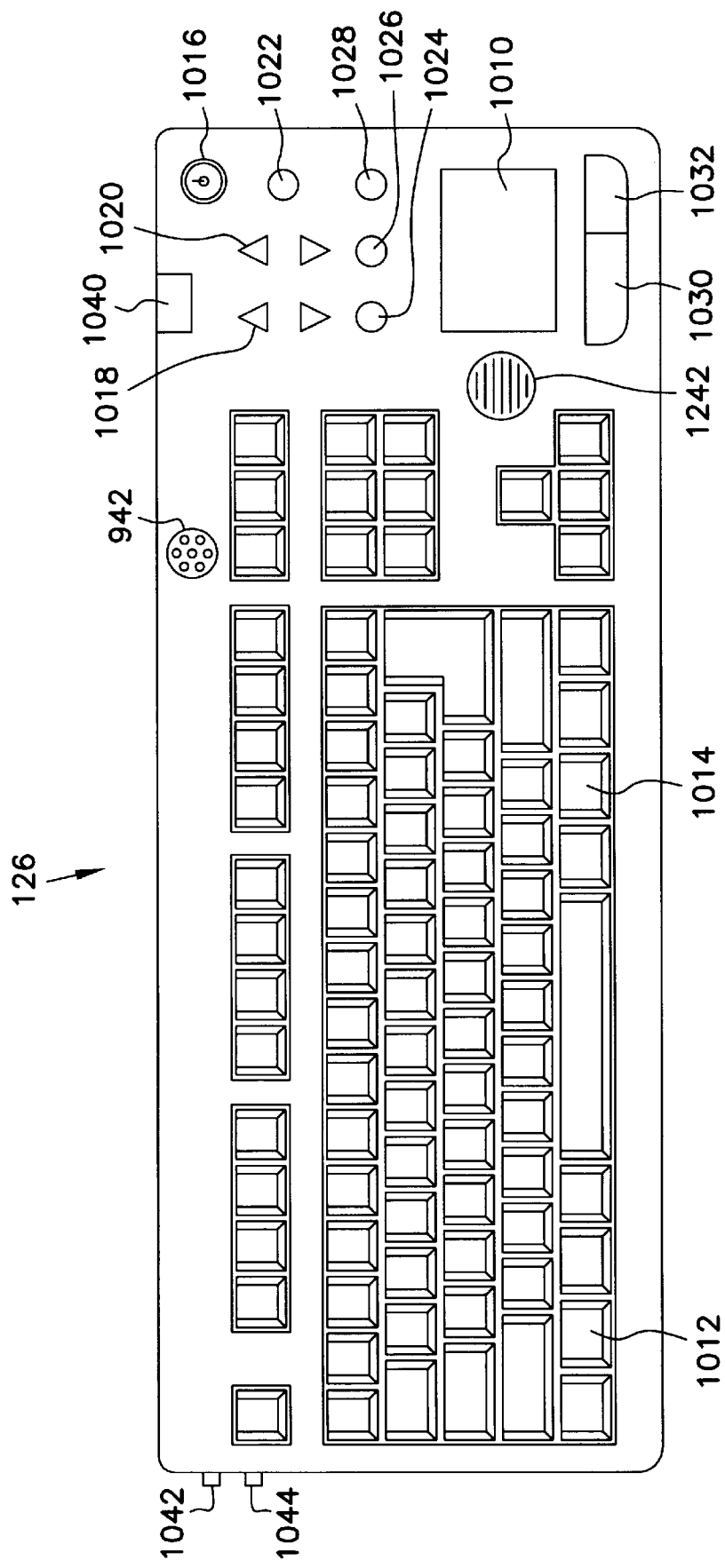
FIG. 10 is a top view of a keyboard remote control device in one embodiment of the present invention.

In one embodiment, as shown in FIG. 9C, a microphone 1244, an earphone 1242, and an RF transceiver are included in remote control devices 124, providing a cordless-telephone functionality, with PC 118 being the base unit and remote control 124 being the remote unit. In another such embodiment, as shown in FIG. 10, a microphone 1244, a speaker 1242, and an RF transceiver are included in remote control device 126, providing a cordless-telephone functionality, with PC 118 being the base unit and remote control 126 being the remote unit. Phone calls can be received or initiated by activating a "phone" function by pressing one or more of the control buttons on the phone, such as simultaneously pressing buttons 922 and 928, which, in one embodiment, toggles function between TV and phone, thereby automatically muting the audio of the TV when phone function is desired.

A power switch is provided at 914 to provide power-on/ off functions for the monitor 122 and resume/rest for personal computer 118. Channel control buttons 916 provide the familiar television/VCR up and down channel control functions. Volume controls 918 are also provided, as is the standard number keypad in television remote controls indicated generally at 920. Further provided are mute button 922, channel recall 924, FAV (favorite channel or menu) button 926 and TV button 928, which serves to cycle the display through full screen display of a television program, to putting it in a window, to hiding it completely. An additional function set control button 930 is used to select functions provided by an operating system beyond those normally provided today. Much as the "Ctrl" and "Alt" keys are used to select different functions, the function set button 930 is similarly used on the hand held remote 124 to select the functions defined by the operating system. FAV button 926 may be unique to each family member, and comprise a listing of the users favorite television programs, games, computer application programs, home pages on internet, or other interfaces into the electronic world.

Hand held remote 124 also contains RF generating circuitry coupled to all the keys and pointing devices for generating RF signals corresponding to the buttons pressed for reception by RF circuitry 324. The power of the RF signal is adjustable via a thumbwheel indicated at 934, which is coupled to further power adjusting circuitry shown in FIG. 12. Power is provided by a standard 9 volt cell 936, or multiple double "A" batteries, accessible via a removable panel 940.

Remote keyboard 126, shown in further detail in FIG. 10, is very similar to a MF II keyboard, except that the numeric key pad has been replaced with television/VCR like remote control buttons, and a touchpad indicated at 1010. In addition, it contains a pair of function set keys 1012 and 1014 for invoking the same functions as button 930 on handheld remote 124. The television/VCR buttons include a power button 1016, volume controls 1018, channel controls 1020, TV/VCR button 1022, mute button 1024, a favorite channel/function button 1026 and a channel recall button 1028. In addition, selection keys 1030 and 1032 are provided to select function indicated by the cursor as controlled by touchpad 1010. Touchpad 1010 is integrated into the remote keyboard, and permits easy manipulation of the cursor by simply moving an object, such as a pen, stick or finger/finger nail across the pad in the desired direction. It can be useful for performing signatures to validate transactions, or restrict access to files. By integrating touch-pad 1010 directly in the remote keyboard 126, there are no external connections, or sliding drawers to contend with, which could easily become clogged with grease, butter, sugar or any of the other messy things people eat while being entertained in a family entertainment center. The portion of the keyboard containing the television/VCR remote controls is preferably sealed, and impervious to being affected by such foods and drinks as are commonly found in a family room. Since the keyboard is more likely to be heavily used, a higher number of double "A" batteries are used. Four to eight provide a suitable length of operation. They may be rechargeable, and an external power jack 1042 is provided to allow the keyboard to be plugged into standard electrical utility power supplies.

As with the handheld remote 124, the keyboard remote 126 comprises RF generating circuitry 1040 to provide RF signals for reception by RF circuitry 324 in personal computer 118. RF circuitry 1040 also adds on a keyboard identifier with the signals it transmits, which identifies each keystroke as originating from the keyboard. In one embodiment, it is a set of bits that is unique to the remote device. This helps prevent inadvertent interference from other owners of similar home entertainment systems from inadvertently controlling the users system. In another embodiment, the frequency is shifted slightly from that emitted by the handheld remote, and RF circuitry 324 detects the bits, or the frequency shift and identifies the keystrokes as originating from either the handheld remote, or the remote keyboard which is associated with the system. In yet a further preferred embodiment, multiple remotes are provided, each with its own identifying frequency or code, including joysticks for controlling games. In this manner, each individual in the room can be controlling their application or program in a window, or be playing different parts in a game. Since all remotes would be sending the same signals to represent the same functions, the drivers for such remotes running on processor 310 need not differ. They need only be designed to handle multiple different sources of the keystrokes, button strokes, mouse, stick or touchpad signals.

Figure 11A:
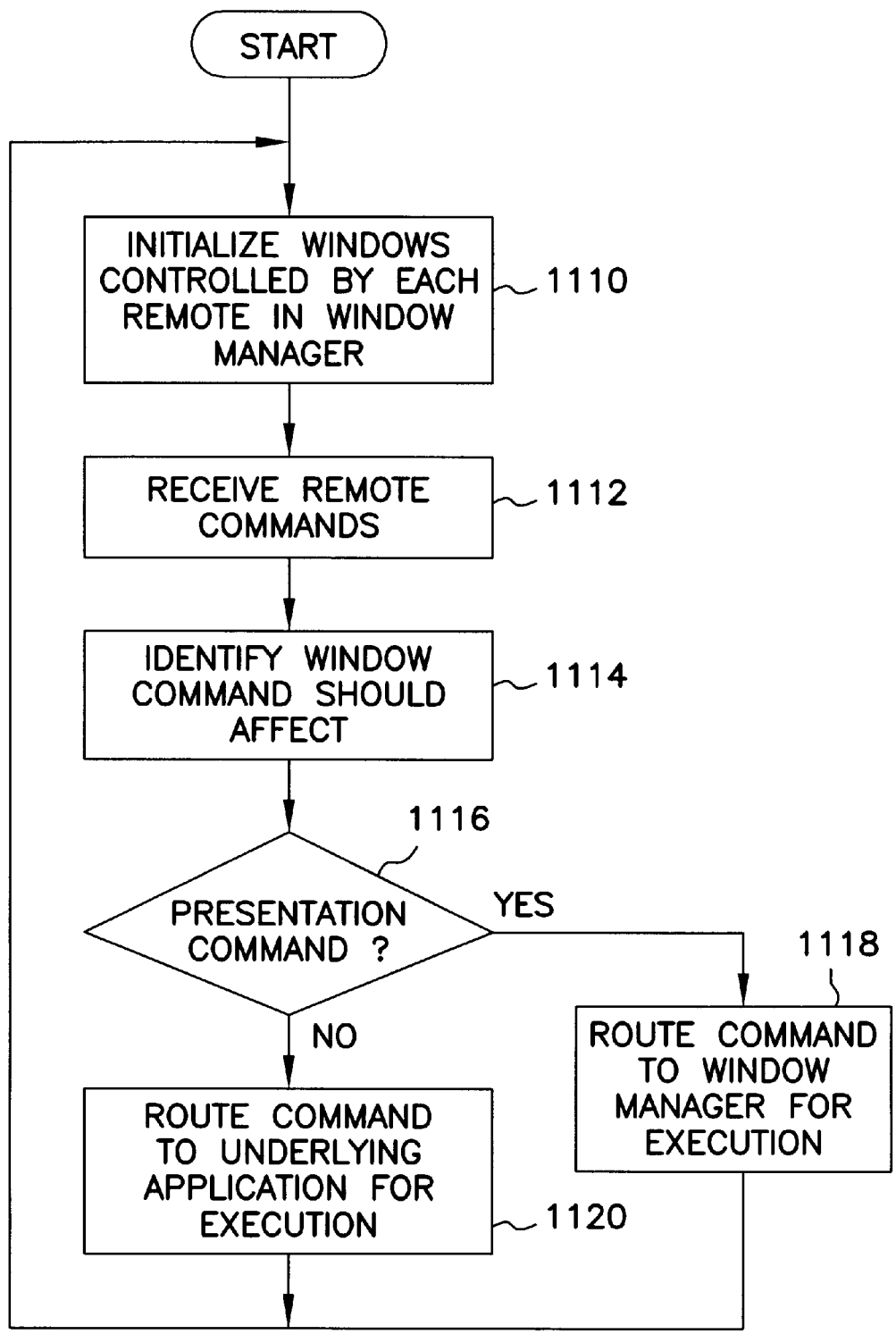
FIG. 11a is a high level flow diagram showing how commands from the remote controls of FIGS. 9a–c and 10 are processed.

A high level flowchart showing how commands issued from different remote control devices are interpreted by processor 310 to control different applications is shown in FIG. 11*a*. When an application is started in a Windows 3.11 or 95 environment, it is initialized as shown at 1110 to be associated with a particular remote. The keys or buttons from such remote are identified in groups of either "keyboard" or "TV" or "game" type keys. Game type keys would be those associated with the stick, trackball or mouse type of pointing devices. Thus, an application could be associated with game keys from the handheld remote for one player of a game, and game keys from the keyboard remote for a second player. Further remotes, or different groups from a remote could be used for further players. When RF circuitry 324 receives signals from a remote, it identifies the command, such as what key was pressed, and which remote device it came from to processor 310 at step 1112. Processor 310 then identifies the application in a window to which is should be applied. If it is a presentation type of command, such as enlarging a window or opening a window as determined at 1116, the command is routed to the window manager for execution at 1118. If not, it is executed on the application that the group it is associated with was initialized to at step 1110. In further preferred embodiments, individual keys are associated with applications, however, at least one group or key is always associated with the underlying operating system to prevent a user from being locked out of other applications. One further use of the above system is to assign TV/VCR controls to television programming associated with a window. In this manner, no cursor need be present in the window, blocking the television programming in order to perform channel selection. In addition, if someone else is watching a program in a different window, their channel selection controls will only affect their window.

Figure 11B:
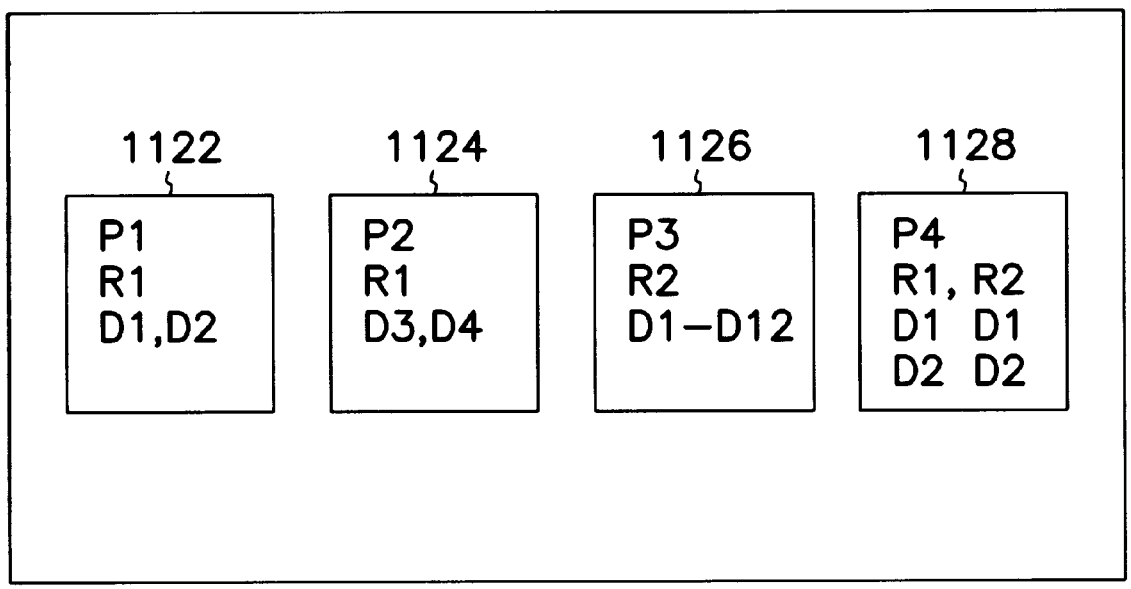
FIG. 11b is a high level block diagram showing the association of remote control devices to applications.

A block diagram in FIG. 11*b* represents tables formed by a program manager to associate remote control devices and the input devices on the remote control devices to programs. Programs, as used herein refer to computer application programs and television programs, both of which are controllable by remote control devices. A first program 1122 is associated with a first remote controller, R1, whose input devices D1 and D2 control the first program. D1 and D2 correspond to the alphanumeric keys, such as a computer keyboard keyset, or subset thereof, or a cursor control device, or even the television control pad previously discussed. Second, third and fourth programs 1124, 1126, and 1128 are also associated with remote control devices, and in some instances multiple remote control devices. Fourth program 1128 is controlled by input device sets D1 and D2 of remote R1, and D1 and D2 of the second remote R2. The low level granularity of associating sets of keys to applications provides great flexibility for a multi-user home entertainment system.

In a further embodiment, FM earphone headsets are provided to enable each person to hear only the sound that is associated with their own window of programming. The sound associated with each program is either assigned to one of several standard FM frequencies and broadcast in low power, much like that in a drive-in movie theater, and each headset is tunable to the frequencies broadcast. In another embodiment, each headset is tuned to a different single frequency, and the user selects the windows whose sound will be broadcast on which frequencies. The top most window in such a set of windows will have its audio so broadcast.

Figure 12:
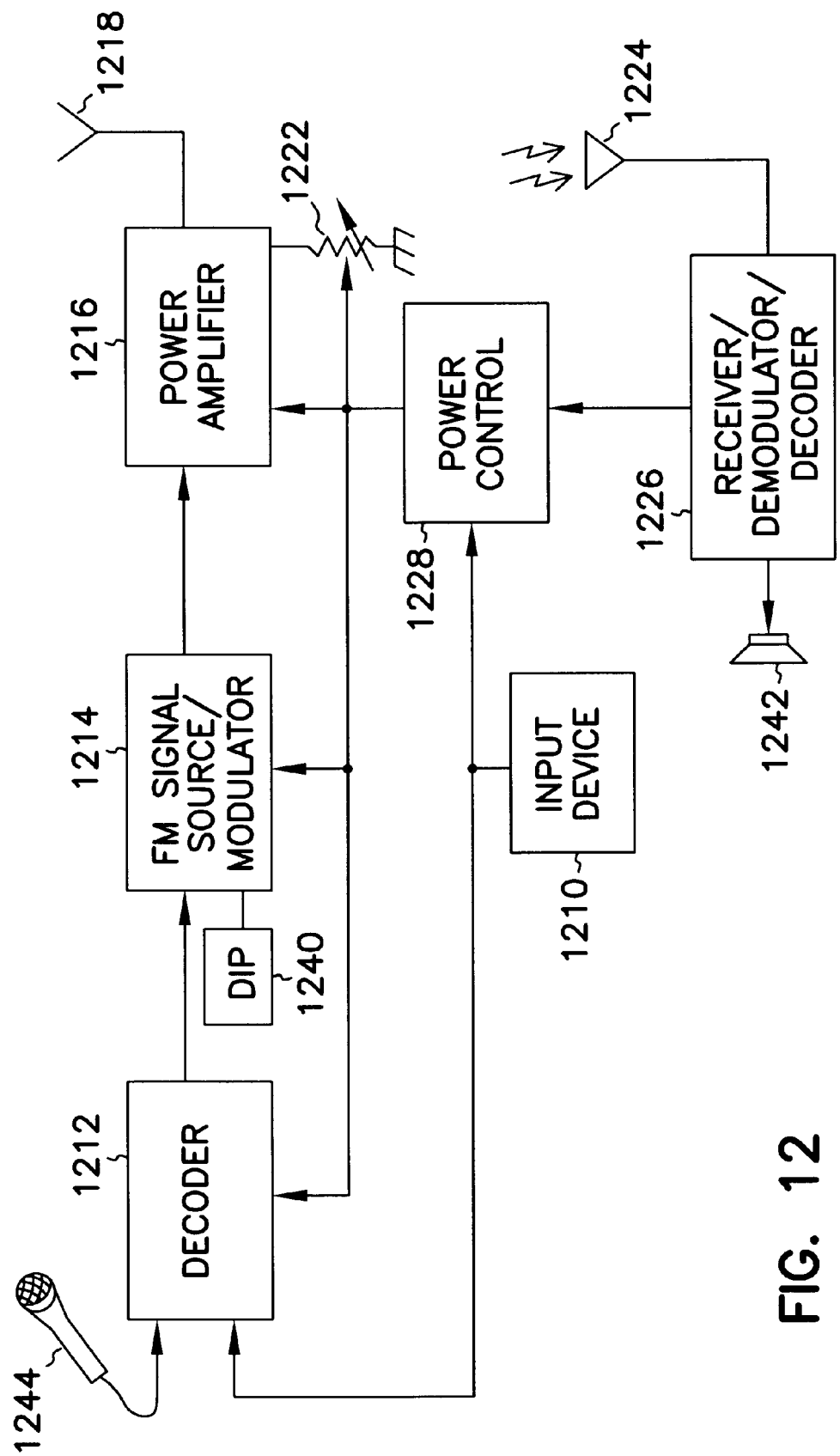
FIG. 12 is a block diagram showing power adjustment controls for the remote control devices of FIGS. 9a–c and 10.

Further detail of RF circuitry in the remote control devices is shown in FIG. 12. An input device, comprising the keyboard or hand held remote is indicated at 1210. When a key, touchpad command, trackball etc command is activated, it is provided to a decoder 1212, which decodes the command into a signal representative of the command to be transmitted. It also adds a header and check bits to the signal to be transmitted, indicating a unique identification of the remote. The identification in one embodiment is a digital signal which is unique for each remote control for one system and stored on an EE-PROM, while in a further embodiment, the code is an eight bit, or a 16 bit code which results in over 64,000 different combinations, making it unlikely that neighbors within range will have remotes with codes that will control a user's system. The unique identifier may also be represented by selecting a different frequency for each remote control device. The system uses this unique identification as described above to determine which program should be affected by the particular command issued from the particular remote that issued it.

The Decoder 1212 provides a decoded signal to an FM signal source and modulator 1214, which in one embodiment generates a desired RF signal in the 900 megahertz region of the electromagnetic spectrum. This signal is provided to a power amplifier 1216, which amplifies the RF signal and provides it to an antenna 1218 for transmission to the system. The power amplifier 1216 consumes most of the power in the remote control device. A potentiometer 1222 is provided to reduce the gain of the amplifier so that it is not always amplifying the signals at the highest power level. Since users will vary the distance they are from the system, there is no need to always transmit at the maximum power level. If a user is close to the system, the user may adjust the power level downward by turning the thumb wheel on the remote in the appropriate direction until the system no longer receives the transmissions. In one embodiment, the receiver in the system detects the signal strength received, and provides visual feedback on the display to assist the user in setting the power level to a level where no errors in transmission due to low power signals are likely to result. Such signal power level detectors are well known in the art, and one example is shown in U.S. Pat. No. 5,193,210. In a further embodiment, the RF receiver 324 also comprises an RF transmitter, and provides an RF signal representative of the power level back to the remote, which is received by a receiver antenna 1224. Antenna 1224 is coupled to a receiver/demodulator/decoder 1226 which decodes the signal and provides a digital signal representative of transmitted signal strength back to a power control circuit 1228. Power control circuit 1228 is coupled to the potentiometer 1222 for adjustment of the gain of power amplifier 1216 based on the signal strength feedback from the system. Power control circuitry 1228 is also coupled to the input device, to sense when commands are entered. It is also coupled to the other components to control when they are supplied power. During touchpad and trackball operation, power is supplied continuously to all the electronics. However, after a predetermined period of time, approximately 1 second, with no further commands being sensed, the power control circuitry 1228 cuts off power to most of the other circuitry, and only turns it back on within milliseconds when activity on the input device 1210 is detected. When other circuitry is powered off, the power control circuit remains active, along with the receiver 1226. The power control circuit 1228 buffers commands until the other circuitry is ready to process the commands. Since it turns back on quickly, there is no perceptible delay by the user.

In a further embodiment, each input device command transmitted is acknowledged by the system with an echo of the command. When no acknowledgement is received, the power control circuitry 1228 instructs the decoder to send the signal again, while increasing the power level until the system properly acknowledges the command. All other commands are buffered in the power control circuitry until successful transmission of the command, whereupon they are transmitted at the new adjusted power level. In one embodiment, the times for rebroadcast are randomly chosen, and prevented if the receiver 1226 detects transmissions from another remote control device or the system to prevent interference. This is not done if each remote has its own transmission frequency, which is set, in one embodiment, by a DIP switch 1240.

In yet another embodiment, the remote control devices are used as a "speakerphone," a hands-free intercom-like connection to the telephone system. In conjunction with the modem telephone functions, the RF circuitry 324 transmits and receives in a manner equivalent to the base unit of a cordless phone. A speaker 1242 on the remote control device is coupled to the receiver 1226, which receives RF voice from the RF circuitry 324, and provides the received sound. A microphone 1244 is coupled to the decoder 1212 for transmitting sound created by the user. Receiver 1226 and decoder 1212 operate in conjunction as the handset of a standard cordless phone. In a further embodiment, the earphone headsets are used in place of the speakers for privacy. In one embodiment, a headset jack is provided in the remote control device as part of the block indicating speaker 1242 and standard headsets may be used.

When the user receives a telephone call, a message appears on the display with the identity of the calling source if caller ID is provided by the telephone service selected. This allows easy interface into available databases to "pull" up further information about the caller stored on the system. A key 931 on the remote is used to answer the call. The keypad is used to enter numbers, with the modem providing standard DTMF (dual-tone, multiple-frequency) tones.

The remotes 124 and 126 also contain jacks 942 and 1044 for game controller input. A standard personal computer analog game port is provided, or in conjunction with the RF transceiver capability of the remote control devices, a bi-directional digital port is provided from jacks 942 and 1044.

Figure 13:
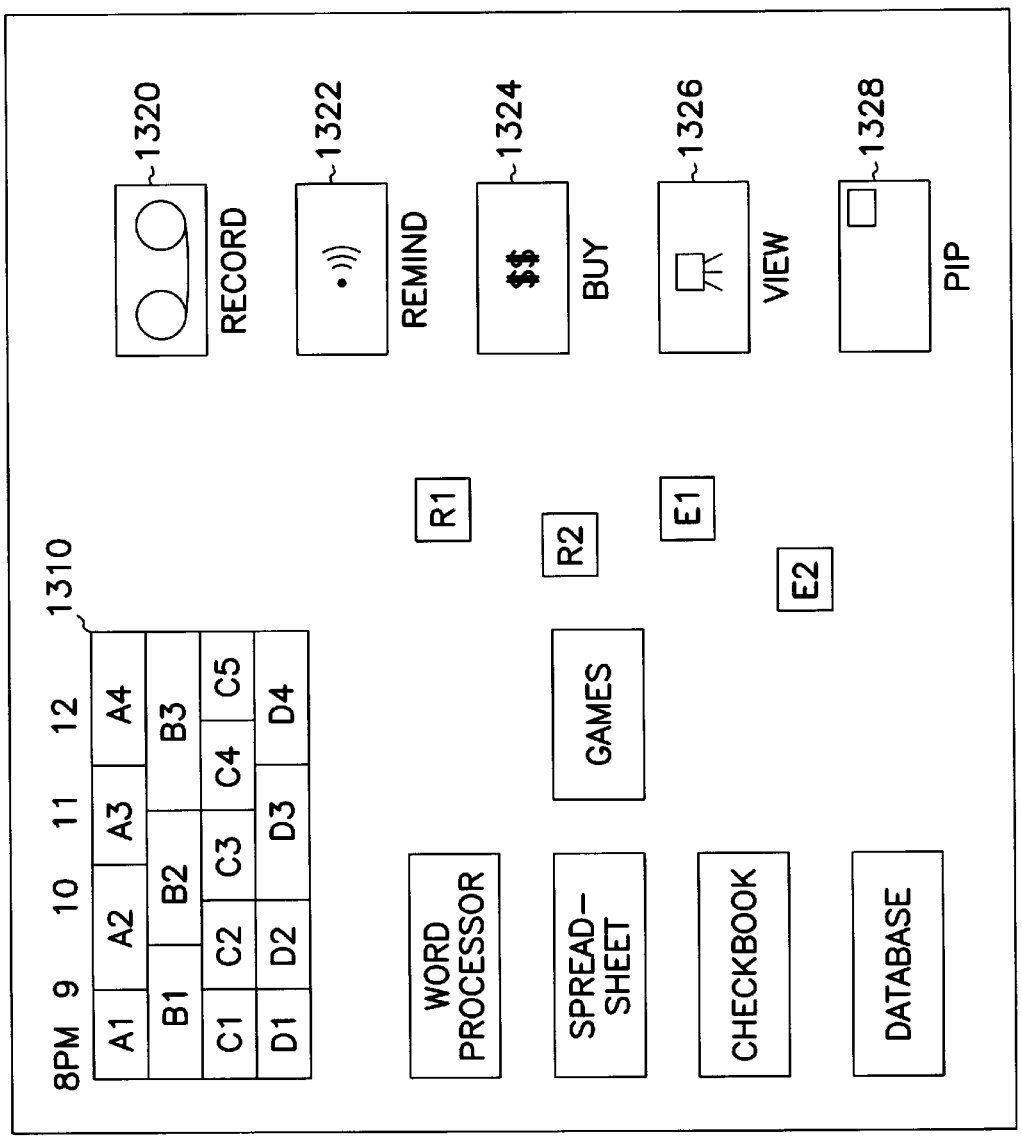
FIG. 13 is a block diagram representation of a user interface displayed on the screen of the present invention.

One example of the advantages of having a full function computer operating in conjunction with broadband video is that it opens up the power of a personal computer to control the video streams and advanced user functions. The interface to the broadband video is much more user friendly. In FIG. 13, one example is shown, with a standard television like schedule indicated generally at 1310. It comprises a timeline across the top, starting at 8 PM and progressing to midnight. Four channels, A, B, C and D are shown, but many more may be available. Other programs, such as games and word processors which may be selected in standard double mouse click fashion are also shown. Both the time frames and the number of channels shown may be modified by the user enlarging the window using standard Windows based navigation techniques. Multiple cells, or programs are shown on each channel, and are represented as a suffix of the channel letter for discussion herein. In actuality, program titles and descriptions appear be inserted in each cell. By clicking on a cell with the right mouse button, further details appear in an expanded version of the cell.

Several icons are tied to functions controlled by the system. A record icon 1320 is tied to either a separate video cassette recorder, the tape drive, or the disk drive to record selected channels. A program cell may be indicated for recording by dragging the cell with a mouse control and dropping it onto the record icon. Similarly, a reminder may be set by dropping a program cell onto a remind icon 1322. If a pay per view program is desired, one simply drags the program cell, which is perhaps outlined in green, over on top of a buy icon 1324. The buy icon is also used when viewing a home shopping channel, or a catalog in a similar manner. To view a primary program, a user either double clicks on a cell, or drags a cell to a view icon 1326 and drops it there. To place a program into a picture in picture format, a user drags a cell onto a PIP icon 1328. The picture in picture window may then be resized like any other window, or moved to another area of the display. All the icons may also be arranged in an L-shape surrounding a primary channel being viewed so that the icons do not interfere with the video images being displayed from the primary channel.

In one embodiment, each remote control device controls a different cursor, shown as R1 and R2 on the screen in FIG. 13. When the cursor is used to select a program, it becomes the primary controller for that program. The keys on the remote are automatically mapped into the program selected. The keyboard however, retains control of the task list, and is capable of selecting a program and becoming the primary control device for that program to the exclusion of the hand held remote control device.

In FIG. 13, icons E1 and E2 represent remote earphones. The personal computer sound card 320 also contains a multi frequency FM transmitter 646 with antenna 648, and has the capability to generate separate sound tracks for each window being displayed on the monitor. It assigns each to one or more sets of earphones and transmits a local FM signal or broadcast IR or RF which is received and played by the earphones set to the right channel. The earphones have tuning circuitry that allows them to be set to a desired channel, or they may be fixed to different frequencies. The user drags the appropriate icon over to the program having the desired sound track, or to the remote that the user is controlling and drops it. If dropped on a program, the sound card transmits the sound for that application on the frequency associated with the earphones which are tuned to that frequency. If it is dropped on a remote control device, the top window associated with that remote has the sound associated with it transmitted.

Figure 14A:
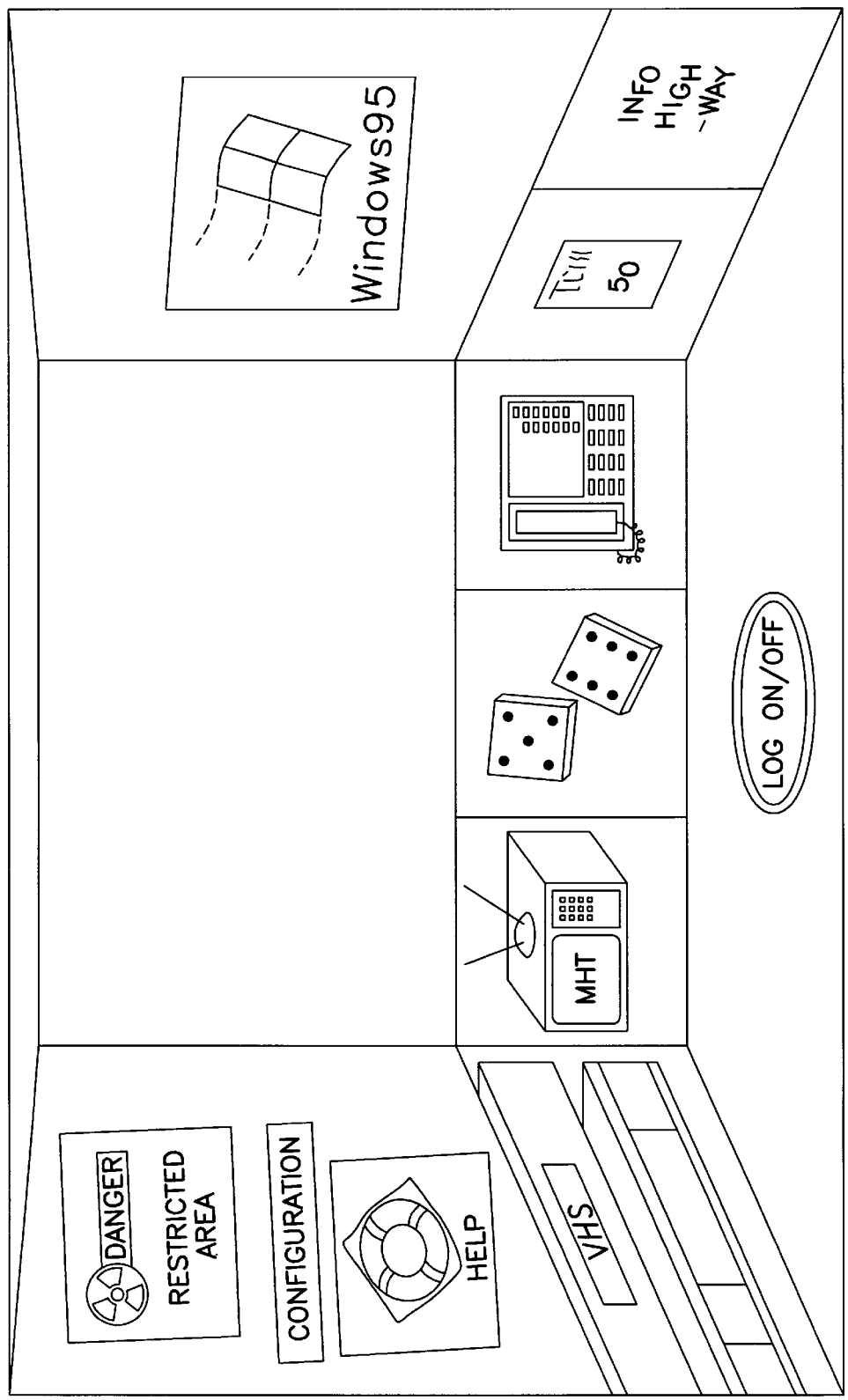
FIG. 14a–f are block diagram representations of a user interface for interacting with the home entertainment system of the present invention.

A first screen display provided on monitor 122 to users is shown in block diagram form in FIG. 14a. The display comprises a set of icons which are tied to underlying functions in a Microsoft Windows95 or down level version operating environment. This front end is specifically designed to be a replacement shell for the normal Windows operating environment to make it user friendly to a family. It acts as an application manager, allowing the user to launch other applications and utilities from within it. The front end is organized into the following areas, each of which leads to further menus: Entertainment, Information Services, Productivity, and Logon/Help/Configuration controls. The front end utilizes Win32c application program interfaces, and operates both as a shell and as a stand-alone application. It supports drag and drop and is Win95 logo compliant.

Further icons on the first screen comprise a logon icon for bringing up a dialog box asking for the user name and password and a help icon for bringing up a context sensitive help engine with a data file which is related to the screen where the help icon was selected. The dialog box for the logon contains an option for a default, or family logon which may not require a password.

Figure 14B:
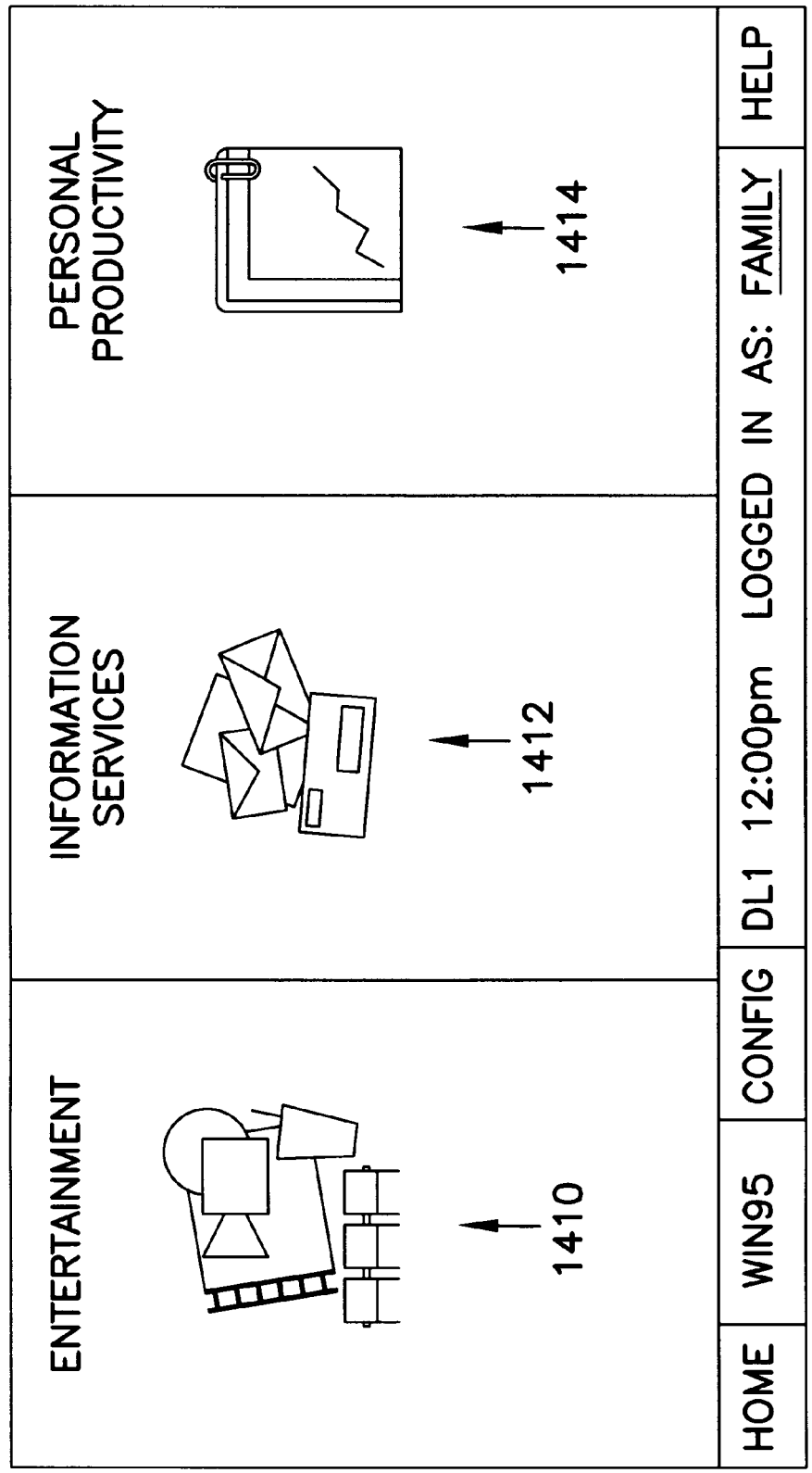
Figure 14C:
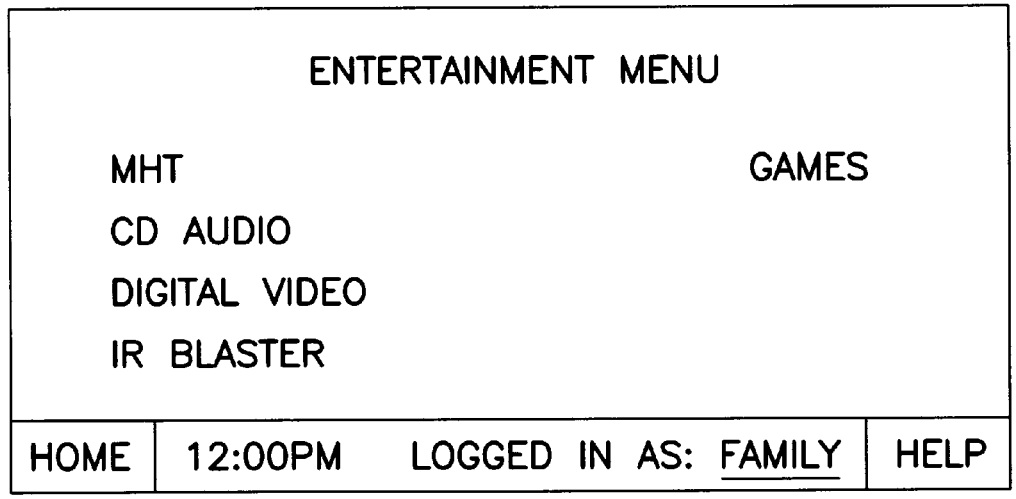

The front end splits the integrated video processing, audio processing and data processing functionality of the entertainment system into different areas of similar functionality as show in the block diagram of FIG. 14b, comprising an entertainment icon 1410, an information services icon 1412 and a personal productivity icon 1414. Each of these icons, when activated by clicking, or from a task list invoke further menus. An entertainment menu in a window on the monitor is shown in FIG. 14c, comprising selections such as Microsoft Home Theater, CD audio, Digital Video, IR Blaster and Games, all of which may be launched from this window. The Games icon provides a user configurable games menu, which has the capability of being user aware, provided the user identified himself or herself at login. The person logged on is also noted at the bottom of the window. Each user is then above to have their favorite games listed when they are logged in. A home icon or control button is active, and takes the user back to the main menu. Help controls are also active, and take the user to context sensitive system and help information.

Figure 14D:
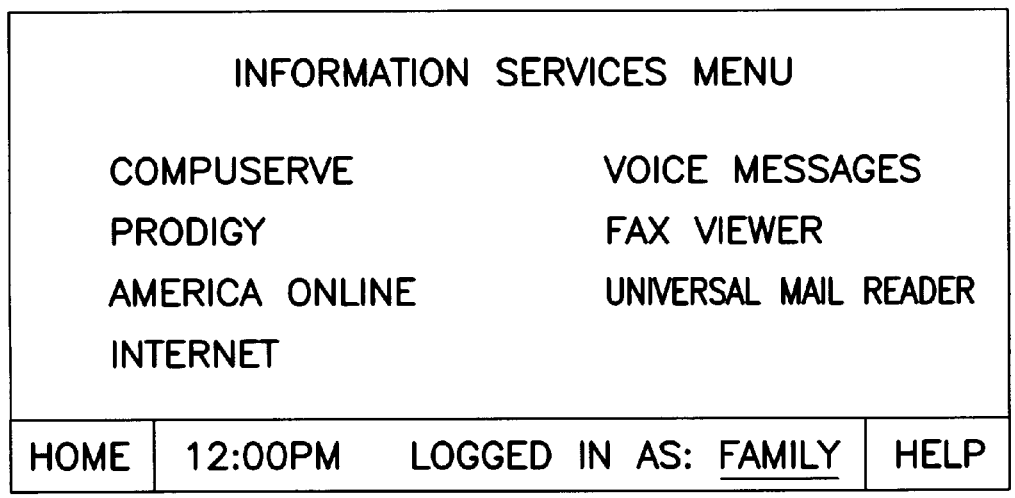

The Information Services icon 1412 leads to a further Information Services Menu as shown in FIG. 14d. Many commercially available information services are launchable, as well as telephony related functions tied to the modem, such as voice messages, fax viewing and mail readers.

Figure 14E:
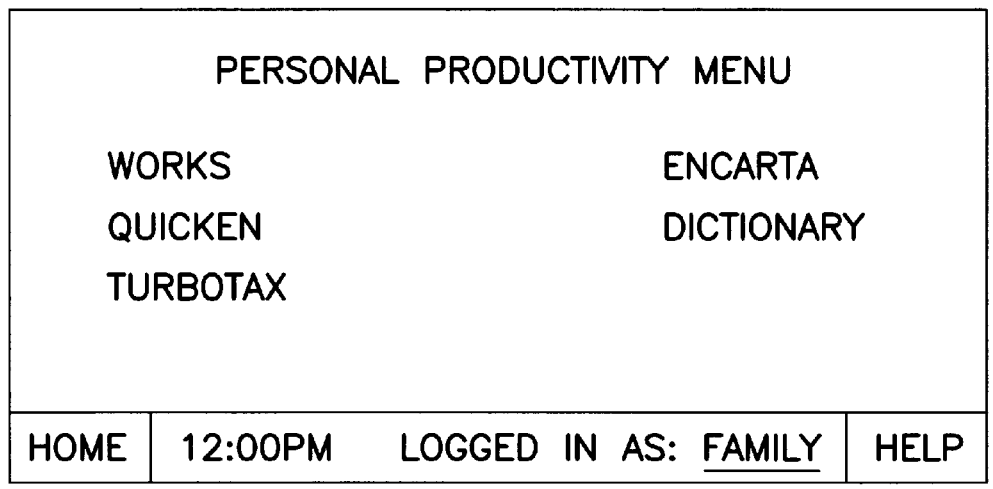

The Personal Productivity icon 1414 leads to a Personal Productivity menu in FIG. 14e, where personal productivity software is launchable. While shown as a text based list, the applications may also be represented by icons.

Figure 14F:
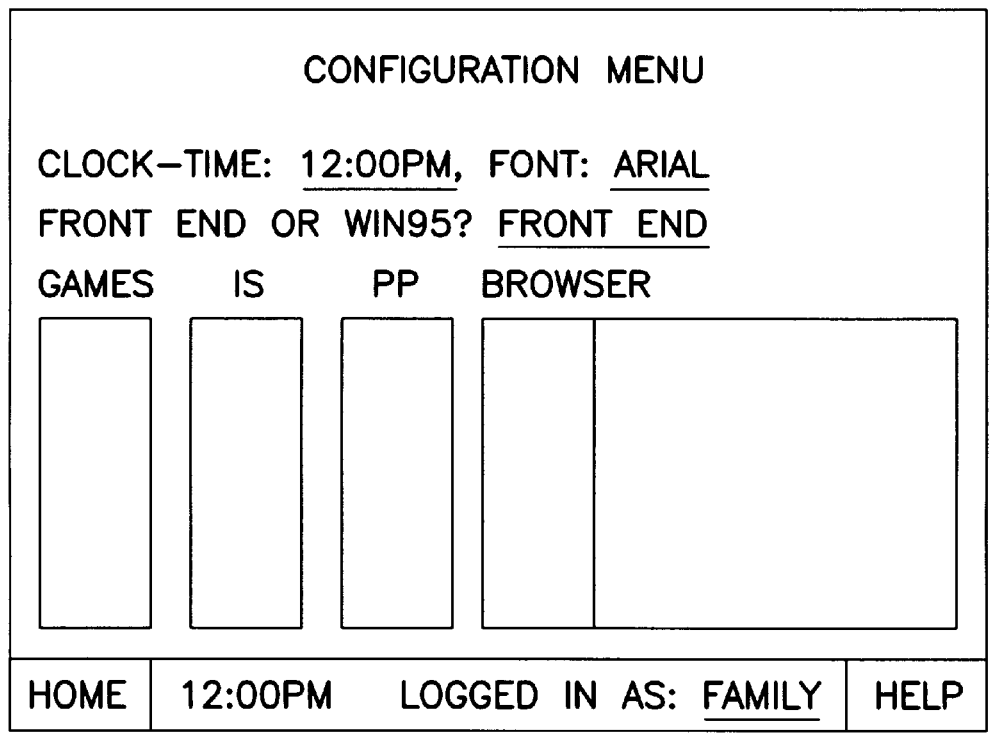

A configuration menu is shown in FIG. 14f and is found through the first screen display. Cancel is the active button in this menu due to the potential to adversely affect the look and operation of the entertainment system. A user can change the front end to essentially a computer program based interface, change the clock of the system, browse the secondary storage for other applications which can be dragged and dropped onto different menus, and remove applications from different menus.

Figure 15:
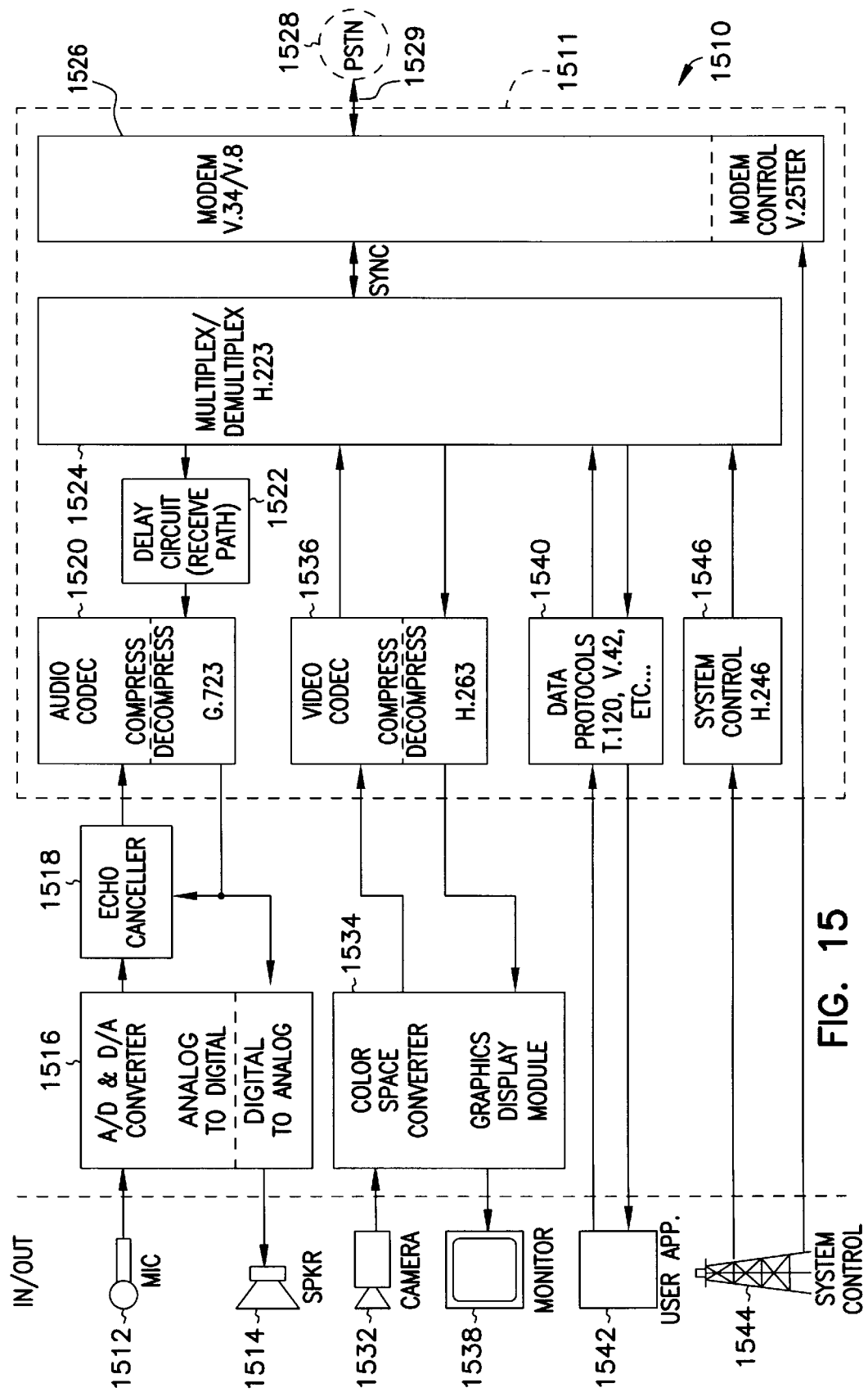
FIG. 15 is a block diagram representation of a video-conferencing system based on the home entertainment system of the present invention.

One embodiment, implemented on a circuit card or cards for providing video conferencing via a public switched telephone network is shown generally at 1510 in FIG. 15. Broken line block 1511 implements an industry standard, such as the proposed ITU-T (International Telecommunications Union-Telecommunications) standard, and each element described hereinafter within block 1511 implements the standards that are identified in the element block. Input/output devices comprising a microphone 1512 and speaker 1514 are coupled to a signal converter 1516. Converter 1516 converts signals from the microphone to digital signals, and digital signals to analog speakers for driving the speaker 1514. Converter 1516 is coupled to an echo cancelling device 1518 for reducing feedback between the speaker and microphone. An audio coder/decoder 1520 is coupled to both the cancelling device 1518 and converter 1516, and to a delay circuit 1522, which in turn is coupled to a multiplexor/demultiplexor 1524 for processing the audio signals. Multiplexor 1524 is in turn coupled to a modem 1526, which has capability for both sending and receiving data on a public switched telephone network ("PSTN") indicated at 1528 in either analog (such as a modem connected to an analog "POTS" or plain old telephone system) or digital (such as a digital ISDN connection) form.

A video camera 1532 (which can be a stand-alone video camera, a commercially available camcorder, or other imaging device) is coupled to suitable video inputs on back panel 710, and is used to provide a video feed to a color space convertor/graphics display module 1535, which provides a further video signal to a video coder/decoder 1536, which is coupled to the multiplexor 1524. Video signals received from the camera are compressed by the codec (coder/decoder) 1536, and then transmitted over the telephone network by modem 1526. Video signals received from the network by modem 1526 are demultiplexed, decompressed and turned into signals (in one embodiment, into VGA signals) for display on a monitor. In addition to providing the ability to perform video conferencing with other compatible systems over a telephone network, several data-exchange protocols are supported at a data converter 1540, which is coupled between the multiplexor 1524 and a data storage device 1542 containing data generated by a user application. A system control icon 1544 represents the ability of the operating system of a computer, such as the computer comprising the home entertainment system, to control the elements of the video conferencing circuitry. System control 1544 is coupled to a system control block 1546, which implements standard H.246 and in turn is coupled to both the multiplexor 1524 and modem 1526 to provide operator control thereof.

Figure 16:
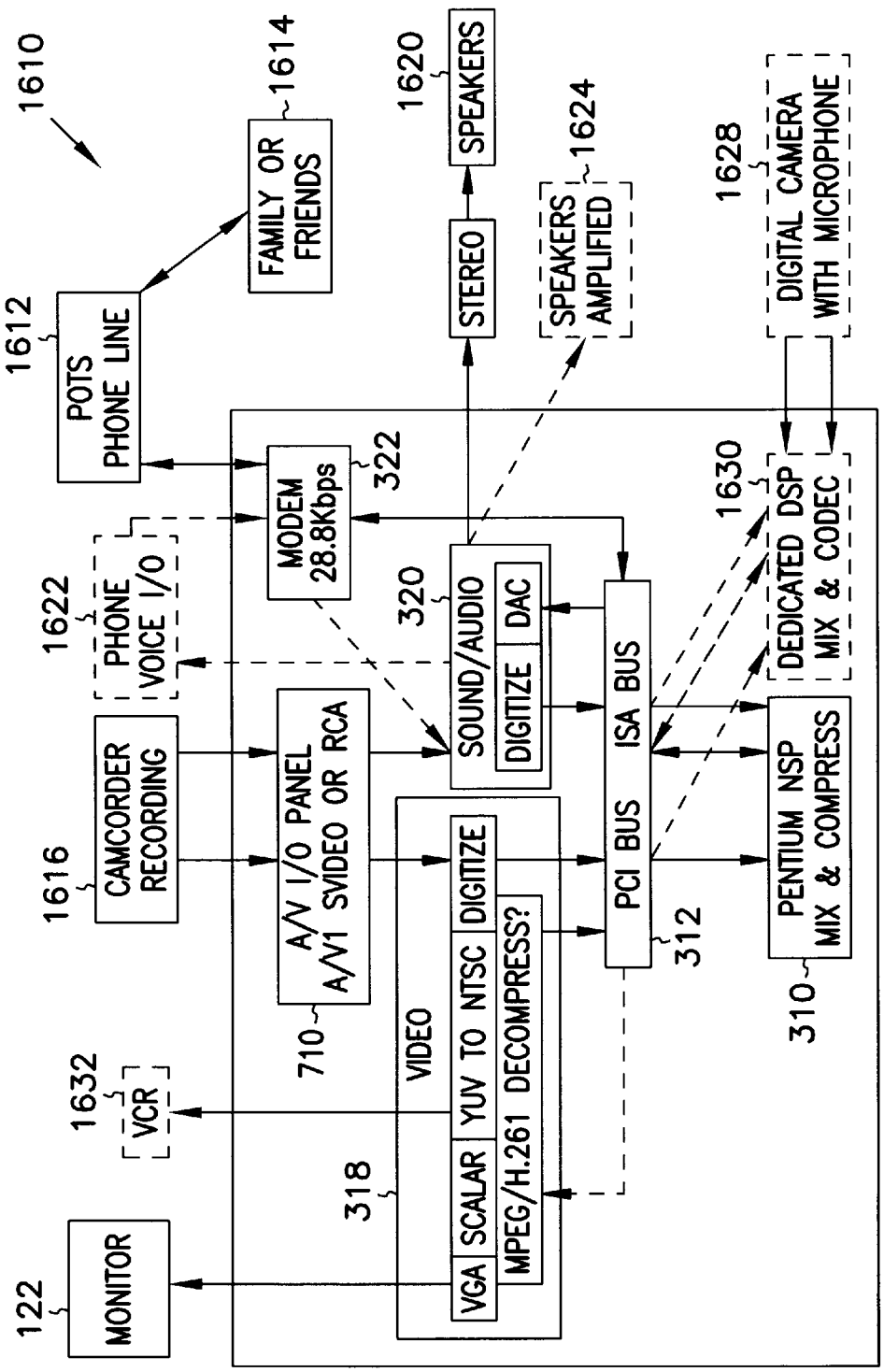
FIG. 16 is a block diagram representation of an alternative video conferencing system based on the home entertainment system of the present invention.

A further embodiment of a video conferencing aspect of the home entertainment system is shown in FIG. 16 generally at 1610. Common components of the home entertainment system are numbered the same as in previous figures. In this implementation, a plain old telephone system ("POTS") connection 1612 (which is alternatively a digital connection such as ISDN into the PSTN) can also is used for the video, sound and data signal transmission. Other users to be connected by video conference are represented at 1614. A camcorder 1616 (which can be a stand-alone video camera, a commercially available camcorder, or other imaging device) is used to provide the audio/video feed via the back panel inputs 710, where the video and audio are then provided to the sound 320 and converter 318 cards for digitization. The digitized signals are then sent through the system bus to the modem 322 for transmission. Received signals via the modem are sent to the CPU, sound card, and video card for decompression and/or playing on monitor 122 and/or a stereo/speaker combination 1620. Elements indicated with broken lines, are advanced features which are easily implementable. They include a voice capability coupled to the sound card 320 and modem 322 for providing a separate voice channel when video conferencing is not desired. A set of amplified speakers are indicated at 1624 which are driven directly by the sound card 320 with no need for independent amplification. A digital camera with microphone indicated at 1628 is coupled directly to a digital signal processor (DSP) with mixing and decoding functions indicated at 1630. The DSP 1630 is coupled directly to the system bus 312. Finally, a video cassette recorder 1632 is coupled to the converter card 318 for recording.

While the system has been described in terms of a personal computer, it is easily modified to encompass a settop box version, where all the circuitry is integrated into one or two cards in a box designed to sit on top of a television having VGA input. In another version, all the circuitry is included inside of the television chassis.

In one embodiment, full multi-media signal sourcing and destinationing of audio/video/digital-data (A/V/D) broadcasts is provided for. Referring to FIG. 1, one embodiment of signal 116 from satellite dish 114 provides digital A/V/D signals from such sources as DirectTV or Primestar. In another such embodiment, signal 116 provides analog A/V such as NTSC antenna signals. In another such embodiment, signal 157 from camera 156 provides analog A/V such as NTSC audio/video signals. In further embodiments, signal 175 from cable source 174 provides analog and/or digital A/V/D. I further such embodiments, signal 163 from PSTN 162 provides data or phone signals such as ISDN or POTS signals. In one set of such embodiments, computer 118 is programmed to automatically record analog signals, such as television programming, onto recordable media, such as video tape, in VCR 172 coupled to cable 173. In another such set of such embodiments, computer 118 is programmed to automatically record digital signals, such as digital television programming or CD-ROM-type audio, onto recordable media, such as recordable compact disks, in CD jukebox 168 coupled to cable 169. CD jukebox 168 also plays CDs or CDROMS for use elsewhere. In another such embodiment, signals are sent to stereo-surround sound system 158 for audio output to one or more speakers 160, and on cable 151 to TV 150. In one such embodiment, earphones 154 on cable 155 and gamepad 152 on cable 153 provide additional input/output through remote control 126. Home network 164 is "smart wiring" used to transmit data and control within the home, coupled by cable 165 to computer 118. VideoBlaster 170 provides video-signal processing on cable/connector 171. Cables 175, 116, 163, 157, 151, 173, 171, 169, 155, and 153 can be wired coupling or wireless (such as RF or IR signals without wires).

It is to be understood that the above description is intended to be illustrative, and not restrictive. Many other embodiments will be apparent to those of skill in the art upon reviewing the above description. The scope of the invention should, therefore, be determined with reference to the appended claims, along with he full scope of equivalents to which such claims are entitled.

What is claimed is:

1. A remote control device for a computer system based entertainment system comprising:

a plurality of keys for selecting symbols and functions representative of computer system commands and television control commands; and electromagnetic frequency generating circuitry coupled to the plurality of keys for transmitting signals representative of the selected keys and identifying the device that transmitted the signals each time one of the plurality of keys is selected.

2. The remote control device of claim 1, wherein the device comprises a keyboard for a personal computer.

3. The remote control device of claim 2 wherein the plurality of keys comprise alphanumeric symbols and cursor control functions associated with the input of text and control of personal computer applications, and further comprise additional dedicated keys for selecting television control functions which are transmitted to the entertainment system.

4. The remote control device of claim 3, wherein the additional dedicated keys for selecting television control functions comprise channel up and channel down keys.

5. The remote control device of claim 3 wherein the additional dedicated keys for selecting television control functions comprise volume up and volume down keys.

6. The remote control device of claim 3 wherein the additional dedicated keys for selecting television control functions comprise a mute button.

7. The remote control device of claim 3 wherein the additional dedicated keys for selecting television control functions comprise a TV key for cycling the entertainment system through multiple video display states.

8. The remote control device of claim 7, wherein the display states comprise:

a full screen display state;

a window screen display state; and a hidden display state.

9. The remote control device of claim 3 wherein the additional dedicated keys for selecting television control functions comprise an on/off key for controlling the entertainment system's use of power.

10. The remote control device of claim 1 wherein the signal transmitted in response to a key being pressed is representative of an eight bit remote id, a multi-bit representation of the key being pressed, error detection and correction bits, and at least one parity bit to ensure accurate reception by the entertainment system.

11. The remote control device of claim 1, wherein the remote control device is a hand held remote control and the plurality of keys comprise a numeric keypad, and additional dedicated keys for selecting television control functions which are transmitted to the entertainment system.

12. The remote control device of claim 11 wherein the additional dedicated keys for selecting television control functions comprise volume up and volume down keys.

13. The remote control device of claim 11 wherein the additional dedicated keys for selecting television control functions comprise a mute button.

14. The remote control device of claim 11 wherein the additional dedicated keys for selecting television control functions comprise a TV key for cycling the entertainment system through multiple video display states.

15. The remote control device of claim 14, wherein the display states comprise:

a full screen display state;

a window screen display state; and a hidden display state.

16. The remote control device of claim 11 wherein the additional dedicated keys for selecting television control functions comprise an on/off key for controlling the entertainment system's use of power.

17. The remote control device of claim 1 wherein the electromagnetic frequency generating circuitry generates signals to be transmitted in the radio frequency range so that the receiver does not need to be located in direct line of sight with the transmitter.

18. The remote control device of claim 1 wherein the electromagnetic frequency generating circuitry generates signals to be transmitted in the infrared range.

19. A remote control device for an entertainment system comprising:

- a plurality of keys for selecting alphanumeric symbols and cursor control functions;
- a touchpad integrated into a keyboard; and
- electromagnetic frequency generating circuitry coupled to the plurality of keys and the touchpad for transmitting signals representative of the selected keys and touchpad each time one of the plurality of keys is selected and the touchpad is utilized.

20. The remote control device of claim 11 wherein the additional dedicated keys for selecting television control functions comprise channel up and channel down keys.

21. A remote control device for a computer system based entertainment system having a plurality of applications simultaneously displayed on a display, the remote control device comprising:

- a plurality of keys for selecting symbols and functions representative of computer system commands and television control commands; and
- electromagnetic frequency generating circuitry coupled to the plurality of keys for transmitting signals representative of the selected keys and identifying the remote control device that transmitted the signals each time one of the plurality of keys is selected, such that the computer based entertainment system supports independent control of the plurality of applications by routing received signals identifying the remote control device to one of the plurality of applications and routes received signals identifying another remote control device to another one of the plurality of applications.

* * * * *